(12) United States Patent
Shi et al.

(10) Patent No.: US 11,553,188 B1
(45) Date of Patent: Jan. 10, 2023

(54) GENERATING ADAPTIVE DIGITAL VIDEO ENCODINGS BASED ON DOWNSCALING DISTORTION OF DIGITAL VIDEO CONTENT

(71) Applicant: Meta Platforms, Inc., Menlo Park, CA (US)

(72) Inventors: Haixia Shi, Sunnyvale, CA (US); Lukas Camra, San Francisco, CA (US); Ang Li, Union City, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 0 days.

(21) Appl. No.: 16/928,594

(22) Filed: Jul. 14, 2020

(51) Int. Cl.
*H04N 19/147* (2014.01)
*H04N 19/154* (2014.01)
*H04N 19/103* (2014.01)

(52) U.S. Cl.
CPC ......... *H04N 19/147* (2014.11); *H04N 19/103* (2014.11); *H04N 19/154* (2014.11)

(58) Field of Classification Search
None
See application file for complete search history.

(56) References Cited

U.S. PATENT DOCUMENTS

| 8,402,094 | B2 | 3/2013 | Bosworth et al. | |
|---|---|---|---|---|
| 8,964,426 | B2 | 2/2015 | Lindemann et al. | |
| 9,017,527 | B2 | 4/2015 | Wiedmeyer et al. | |
| 9,936,208 | B1* | 4/2018 | Brailovskiy | H04N 19/14 |
| 2011/0002391 | A1* | 1/2011 | Uslubas | H04N 19/132 375/240.16 |
| 2012/0166532 | A1 | 6/2012 | Juan et al. | |
| 2012/0275511 | A1* | 11/2012 | Shemer | H04N 19/14 375/E7.126 |
| 2017/0085872 | A1* | 3/2017 | Perron | H04N 21/2402 |
| 2018/0376153 | A1* | 12/2018 | Gokhale | H04N 19/137 |

OTHER PUBLICATIONS

Ann Aaron et al. "Per-Title Encode Optimization" Netflix Technology Blog; Dec. 14, 2015; https://netflixtechblog.com/per-title-encode-optimization-7e99442b62a2.

* cited by examiner

*Primary Examiner* — Samuel D Fereja
(74) *Attorney, Agent, or Firm* — Keller Preece PLLC

(57) ABSTRACT

Methods, systems, and non-transitory computer readable storage media are disclosed for two-phase encoding a digital video based on downsampling distortion of the digital video and a constant rate factor transition threshold. For example, the disclosed system can determine a downsampling distortion indicating a measure of distortion resulting from downsampling an input digital video. The disclosed systems can utilize the downsampling distortion to determine a constant rate factor transition threshold for selecting sets of encoding parameters. For example, the disclosed systems can select a first set of encoding parameters below the constant rate factor transition threshold and a second set of encoding parameters at or above the constant rate factor transition threshold. Additionally, the disclosed systems can generate first and second sets of digital video encodings of the input digital video by utilizing the first and second sets of encoding parameters, respectively.

20 Claims, 15 Drawing Sheets

360 x 540

720 x 1080

720 x 1080

GENERATING ADAPTIVE DIGITAL VIDEO ENCODINGS BASED ON DOWNSCALING DISTORTION OF DIGITAL VIDEO CONTENT

BACKGROUND

Improvements to computer processing, digital imaging capabilities, and digital communications have resulted in increasing prevalence of streaming digital video on many different computing devices via computer networks. Indeed, many computing devices are capable of accessing digital videos stored at online video systems via streaming video connections. Additionally, many computing devices (e.g., smartphones) have image capture devices for capturing and uploading high-quality digital videos to online video systems to share with other computing device. The online video systems can then transmit the digital video these other computing devices of other users via a digital streaming connection.

Because high-quality digital videos can demand significant processing and/or network resources, encoding digital videos for delivery to different computing devices is an important aspect of digital media systems. Specifically, different computing devices can have different processing, network, and/or display capabilities. Thus, online video systems typically create copies of high-quality digital videos using different encoding parameters (e.g., using a "bitrate ladder") ahead of time for delivering on-the-fly to computing devices with different capabilities. For example, online video systems often provide lower quality videos to smartphones with smaller screens than to desktop devices, or to devices with poorer network connections (e.g., lower download speeds).

Although conventional online video systems can generate different video encodings to deliver to different computing devices, these systems continue to suffer from a number of technical deficiencies with regard to efficiency and accuracy. For example, conventional systems are often inefficient and require significant storage resources. Online video systems are typically constrained by storage capacity due to hosting a high volume of digital videos. Thus, some online video systems attempt to reduce the storage requirements for each digital video by generating a limited set of video encodings. Specifically, some conventional online video systems attempt to balance quality with encoding bitrates by scaling the resolution of digital videos with the bitrate of the digital videos with set relationships (e.g., at approximately half the bitrate, the resolution is between 60-65% of the original digital video). To illustrate, some conventional systems utilize an adaptive constant rate factor method, that utilizes a single constant rate factor and then transcodes an input video to a variety of different resolutions and corresponding bitrates. Utilizing set resolution-bitrate proportions, however, leads to generating inaccurate, low quality video encodings. Such video encoding methods can result in increased degradation of the quality and/or size of some digital videos at certain bitrates.

Accordingly, there are a number of disadvantages with conventional digital video systems.

SUMMARY

One or more embodiments provide benefits and/or solve one or more of the foregoing or other problems in the art with systems, methods, and non-transitory computer readable storage media that generate two-phase digital video encodings based on a downscaling distortion of content portrayed in input digital videos and a corresponding constant rate factor transition threshold. More particularly, the disclosed systems can determine a downsampling distortion for an input digital video, which indicates a measure of distortion resulting from downsampling the input digital video. The disclosed systems can determine this downsampling distortion without performing encoding (by utilizing a similarity filter), so that the downsampling distortion can be obtained at a low processing cost. The disclosed systems can then utilize the downsampling distortion to determine a constant rate factor transition threshold. This constant rate factor transition threshold is utilized to select efficient and accurate encoding parameters. For example, the disclosed systems can select a first set of encoding parameters below the constant rate factor threshold for generating a first set of digital video encodings, and a second set of encoding parameters at the constant rate factor transition threshold for generating a second set of digital video encodings. More specifically, the disclosed systems can generate a first set of digital video encodings by modifying a constant rate factor while maintaining a constant resolution (until reaching the constant rate factor transition threshold). Once the constant rate factor reaches the constant rate factor transition threshold, the disclosed systems can generate a second set of digital video encodings by modifying a resolution while maintaining a single constant rate factor at the constant rate factor transition threshold.

Additional features and advantages of one or more embodiments of the present disclosure will be set forth in the description which follows, and in part will be obvious from the description, or may be learned by the practice of such example embodiments.

BRIEF DESCRIPTION OF THE DRAWINGS

Various embodiments will be described and explained with additional specificity and detail through the use of the accompanying drawings in which.

DETAILED DESCRIPTION

Figure 1:
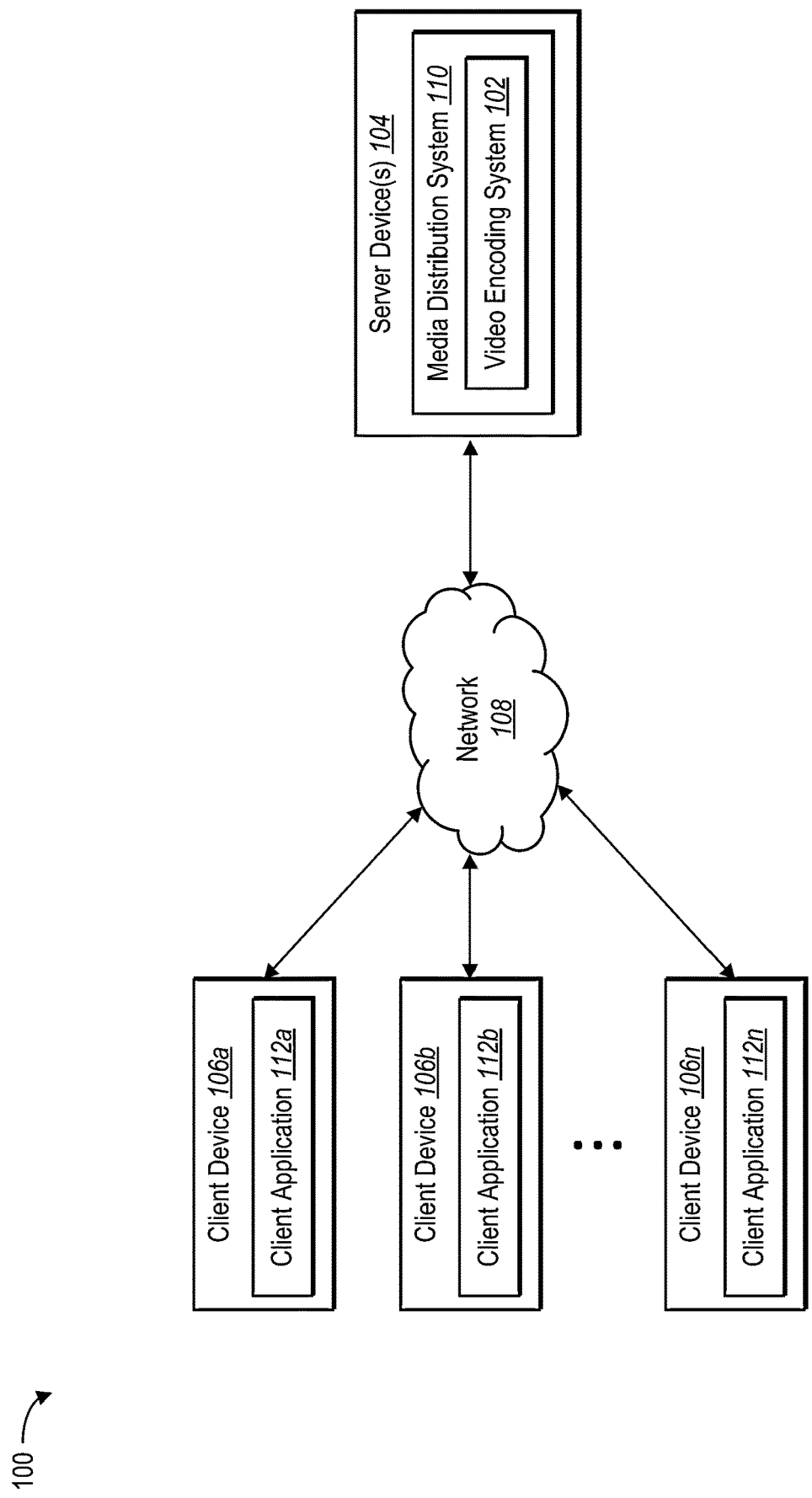
FIG. 1 illustrates an example environment in which a video encoding system can operate in accordance with one or more implementations.

One or more embodiments of the present disclosure include a video encoding system that generates adaptive digital video encodings based on a downscaling distortion of input digital videos and a constant rate factor transition threshold. For example, the video encoding system can determine a measure of distortion resulting from downsampling a digital video based on the content complexity of the digital video. Specifically, digital videos with high content complexity can experience significant detail loss in response to reducing the resolution of the digital videos, while digital videos with low content complexity may lose fewer details in response to reducing the resolution of the digital videos. The video encoding system can then utilize the downsampling distortion to determine a constant rate factor transition threshold for selecting encoding parameters at different bitrates when generating video encodings from the digital video.

After determining a constant rate factor transition threshold, the video encoding system can select a first plurality of encoding parameters below the constant rate factor transition threshold and a second plurality of encoding parameters at or above the constant rate factor transition threshold. Indeed, for constant rate factors below the constant rate factor threshold, the video encoding system can transcode to fixed resolution (e.g., the encoded resolution is equal to the input resolution of the input digital video), and control the bitrate by incrementing the constant rate factor parameter. For constant rate factors above the constant rate factor transition threshold the video encoding system can transcode to a fixed constant rate factor equal to the constant rate factor transition threshold, and control the bitrate by decreasing the coding resolution. Thus, the video encoding system can accurately and flexibly generate a plurality of video encodings based on the content of a digital video while maintaining high visual quality across different encoding bitrates.

As mentioned, the video encoding system can determine a downsampling distortion for an input digital video. For example, in one or more embodiments, the video encoding system first generates a downsampled digital video from the input digital video by reducing a resolution of the input digital video. The video encoding system can then upsample the downsampled digital video by increasing the resolution of the downsampled digital video (e.g., back to the resolution of the input digital video). After generating the upsampled digital video, the video encoding system can determine the downsampling distortion by comparing the input digital video to the upsampled digital video. According to one or more embodiments, the video encoding system determines the downsampling distortion by utilizing a filter to compare the input digital video to the upsampled digital video to generate a structural similarity that indicates the downsampling distortion.

Furthermore, the video encoding system can utilize the downsampling distortion to determine a constant rate factor transition threshold for the input digital video. In one or more embodiments, the video encoding system can fit the downsampling distortion to a distortion-threshold curve that maps the downsampling distortion of the input digital video to a constant rate factor transition threshold. For instance, the video encoding system can determine the distortion-threshold curve by processing a plurality of digital videos to determine relationships between downsampling distortion and constant rate factor transition thresholds for the plurality of videos. The video encoding system can thus determine constant rate factor transition thresholds based on historical data by fitting new digital videos to a distortion-threshold curve based on the downsampling distortion of the new digital videos.

After determining a constant rate factor transition threshold for a digital video, the video encoding system can generate video encodings based on the constant rate factor transition threshold. Specifically, the video encoding system can generate a first set of video encodings using a first plurality of encoding parameters that set different constant rate factors (below the constant rate factor transition threshold). In particular, the video encoding system can utilize this set of different constant rat factors for different encoding bitrates while maintaining a constant resolution across the different encoding bitrates.

The video encoding system can also utilize the constant rate factor threshold to generate a second set of video encodings reflecting a second plurality of encoding parameters. For this second set of encoding parameters, the video encoding system can maintain a single constant rate factor based on the constant rate factor threshold (e.g., a single value for the constant rate factor at the constant rate factor threshold). More specifically, the video encoding system can utilize a second set of encoding parameters that utilize the single constant rate factor while utilizing different resolutions for different encoding bitrates across the digital video encodings. By establishing encoding parameters for a digital video based on a dynamically determined constant rate factor transition threshold, the video encoding system can generate video encodings with different bitrates while optimizing quality across all of the video encodings according to the content complexity of the digital video.

As mentioned, the video encoding system provides a number of advantages over conventional systems. For example, the video encoding system improves the accuracy of computing systems that provide digital video to a plurality of computing devices. In contrast to conventional systems, which typically utilize a standard set of encoding parameters with static relationships between bitrates and video encoding resolutions, the video encoding system can dynamically select encoding parameters for generating video encodings based on the content complexity of digital videos. In particular, by utilizing a downscaling distortion of a digital video (e.g., based on the specific content complexity of the digital video) to determine encoding parameters for a plurality of video encodings, the video encoding system provides more accurate quality across different encoding bitrates over conventional systems.

Furthermore, the video encoding system improves the flexibility of computing systems that provide digital video to a plurality of computing devices. Specifically, in contrast to conventional systems that often do not take the specific content of the digital videos into account, the video encoding system tailors video encodings based on the content of each digital video by determining a constant rate factor transition threshold for each individual digital video. Indeed, the video encoding system can determine a constant rate factor transition threshold for each digital video to determine the constant rate factor (or bitrate) at which to begin modifying a resolution while encoding the digital video. This allows the video encoding system to determine an optimized encoding resolution and constant rate factor for each encoding bitrate for each digital video for balancing quality, storage size, and processing resources.

Additionally, the video encoding system can provide improved efficiency while accurately encoding digital video. As mentioned, the video encoding system can select different combinations of encoding parameters based on a constant rate factor threshold to generate digital video encodings of heightened quality at any particular bitrate. Moreover, in some embodiments, the video encoding system can process historical data associated with a plurality of digital videos utilizing a model to determine relationships between the content complexity of digital videos and constant rate factors. By generating distortion-threshold curves for digital videos with different content complexities, the video encoding system can more efficiently generate video encodings for a particular digital video. When encoding a digital video, the video encoding system can quickly determine encoding parameters by fitting the downscaling distortion of the digital video to a previously generated distortion-threshold curve.

As illustrated by the foregoing discussion, the present disclosure utilizes a variety of terms to describe features and advantages of the video encoding system. Additional detail is now provided regarding the meaning of such terms. For example, as used herein, the term "digital video" refers to a sequence of digital images stored, transmitted, or displayed on a computing device. A digital video can include a video stored in a cloud-storage environment or an online environment that provides access to a plurality of client devices, such as by streaming or otherwise transmitting the digital video to the client devices. Furthermore, an "input digital video" includes a digital video that is to be processed for generating video encodings. For example, an input digital video can include a digital video received from a client device that is to be streamed to other client devices using digital video encodings. As used herein, the term "downsampled digital video" refers to a digital video having a reduced resolution (e.g., relative to an initial, pre-processed digital video). Additionally, as used herein, the term "upsampled digital video" refers to a digital video having an increased resolution (e.g., relative to a downsampled digital video).

As used herein, the term "digital video encoding" (or "video encoding") refers to a digital video encoded using one or more video encoders to compress a size of the digital video. For instance, the video encoding system can generate a video encoding of an input digital video by applying one or more encoding parameters for reducing the size of the input digital video. Furthermore, as used herein, the term "encoding parameter" refers to a value applied (via a video encoder) that results in modifying a digital video based on the applied value. To illustrate, an encoding parameter can include a video resolution (e.g., pixel width and/or pixel height) or a constant rate factor. Accordingly, applying different encoding parameters to a single digital video (via a video encoder) can result in different video encodings (e.g., video encodings with different compressions or other characteristics).

As used herein, the term "constant rate factor" refers to a quality setting for a video encoder for generating video encodings from a digital video. For example, a constant rate factor can include a value (e.g., from 0 to 51) that, when applied to a digital video when encoding the digital video, results in a specified (e.g., consistent, constant) measure of quality in accordance with the value of the constant rate factor. The video encoder can utilize the constant rate factor to adjust the file data rate to achieve a selected quality setting (instead of adjusting to achieve a particular bit rate). Specifically, a video encoder can utilize a constant rate factor to compress different frames by different amounts to achieve a consistent measure of perceived quality (but resulting in a varying quantization parameter reflecting data lost or discarded in encoding). To illustrate, utilizing a constant rate factor, a video encoder can increase the quantization parameter (increase lost or discarded data) for high motion frames (compressing them more because perceived quality of high motion frames requires less detail), while lowering the quantization parameter for low motion frames (compressing them less because perceived quality of low motion frames requires more detail). Thus, a lower constant rate factor can result in a higher quality video encoding at the expense of having a higher size file, while a higher constant rate factor can result in a lower quality video encoding with a lower size file.

As used herein, the term "constant rate factor transition threshold" refers to a threshold value of constant rate factor. For example, a constant rate factor transition threshold can include a value of constant rate factor that the video encoding system uses to generate different sets of digital video encodings with different encoding parameters. For example, the video encoding system can generate a first set of digital video encodings utilizing a first plurality of encoding parameters below the constant rate factor transition threshold and a second set of digital video and a second set of digital video encodings utilizing a second plurality of encoding parameters at the constant rate factor transition threshold. In one or more embodiments, the constant rate factor transition threshold can be a value selected to approximate a convex hull for encoding a digital video at a plurality of different bitrates. As described in greater detail below, a convex hull reflects the optimal selection of constant rate factor and/or compression across different bitrates. In some embodiments, the video encoding system selects a constant rate factor transition threshold to approximate the shape of the convex hull. For instance, a constant rate factor transition threshold can include an approximated value of constant rate factor below which modifying a constant rate factor during encoding of a digital video results in equal or better quality than modifying a resolution of a digital video during encoding of the digital video.

As used herein, the term "downsampling distortion" refers to a measure of distortion resulting from reducing a resolution of a digital video. In particular, reducing a resolution of a digital video can result in a loss of information in the digital video due to storing/displaying the information with fewer pixels. Thus, a downsampling distortion is representative of the amount of data lost from downsampling a digital video. High content complexity (e.g., digital video with many small details) can result in greater downsampling distortion, while low content complexity (e.g., digital video with fewer small details) can result in lower downsampling distortion. Furthermore, as used herein, the term "structural similarity" refers to a specific measurement of a downsampling distortion of a digital video. For example, the video encoding system can determine a structural similarity of a digital video by utilizing a video filter to compare two digital videos to determine how similar the digital videos are. To illustrate, a higher structural similarity value can indicate fewer differences between the compared digital videos, and a lower structural similarity value can indicate more differences between the compared digital videos.

Figure 5A:
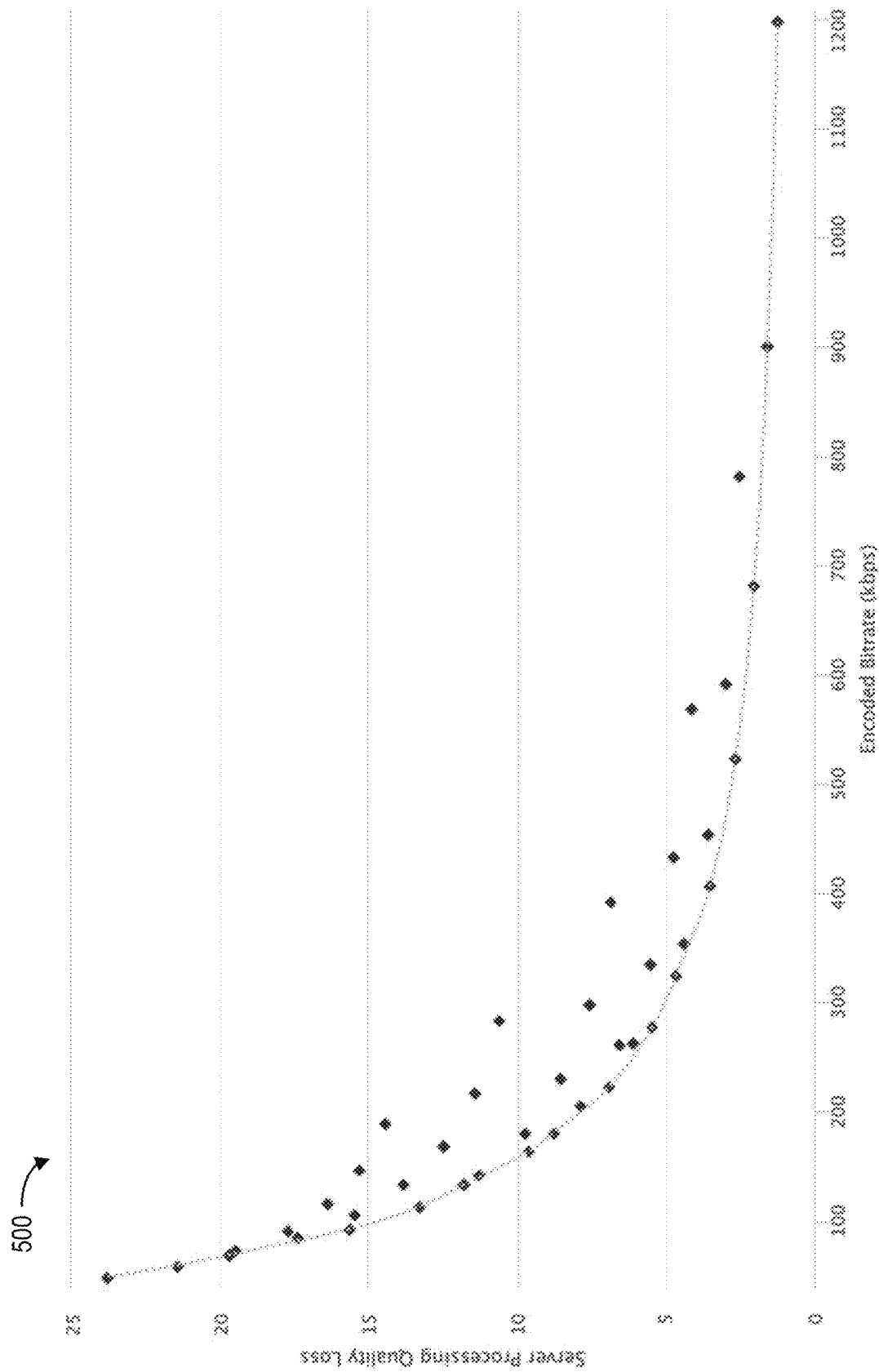
FIG. 5A illustrates a graph depicting a convex hull of a digital video in accordance with one or more implementations.
Figure 5B:
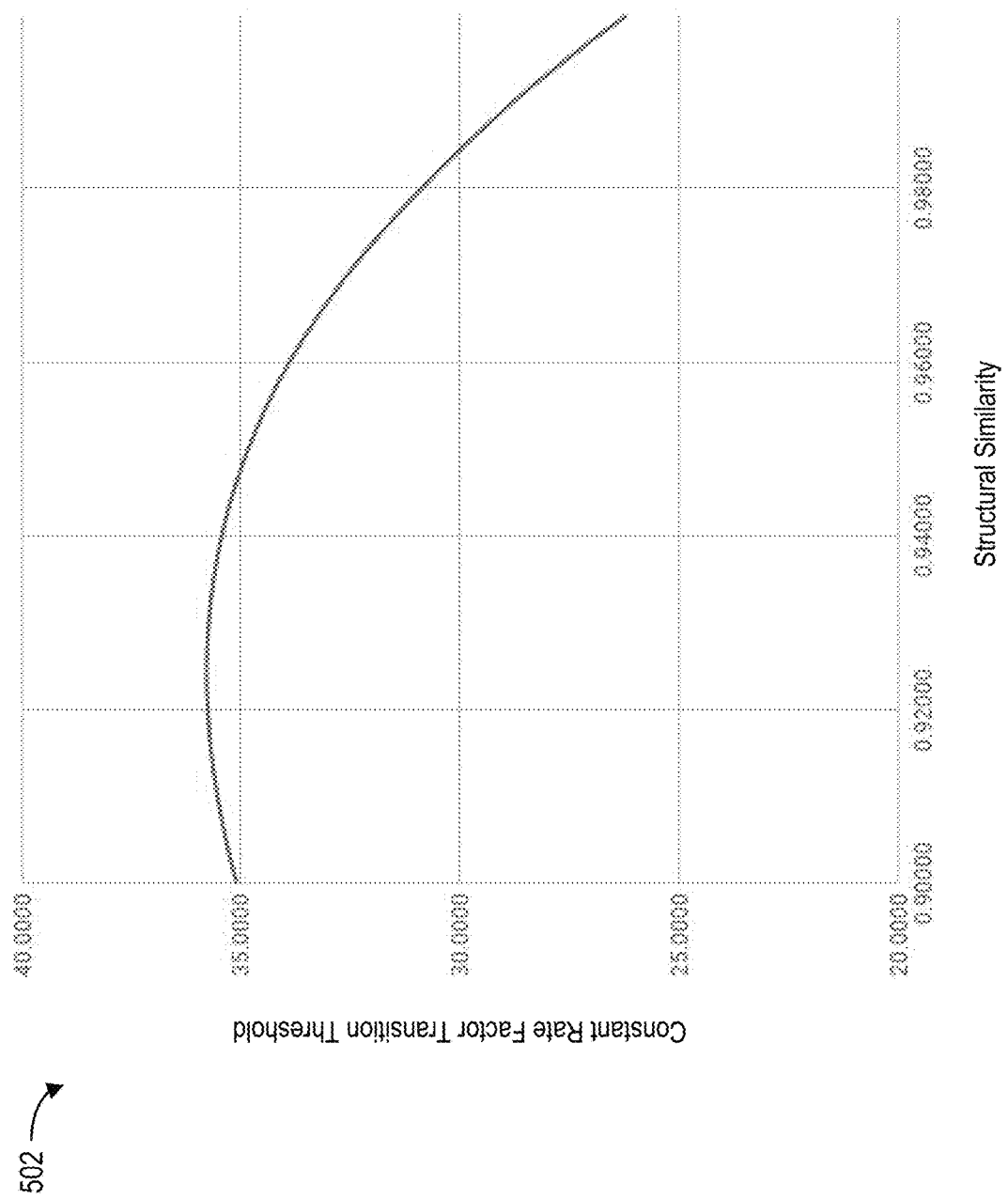
FIG. 5B illustrates a graph depicting a distortion-threshold curve in accordance with one or more implementations.

As used herein, the term "distortion-threshold curve" refers to a computer-implemented algorithm, function, model, graph, database, or array that reflects a relationship between downsampling distortion values and constant rate factor transition threshold values. Specifically, a distortion-threshold curve can be generated based on historical downsampling distortions and historical constant rate factor transition thresholds for a plurality of digital videos. Although described as a "curve" generally, the distortion-threshold curve can reflect a variety of different relationships (e.g., linear, logarithmic, v-shaped). FIG. 5B below illustrates an example embodiment of a distortion-threshold curve.

Additional detail will now be provided regarding the video encoding system in relation to illustrative figures portraying exemplary implementations. To illustrate, FIG. 1 includes an embodiment of a system environment 100 in which a video encoding system 102 can operate. In particular, the system environment 100 includes server device(s) 104 and a plurality of client devices 106a-106n in communication via a network 108. Moreover, as shown, the server device(s) 104 include a media distribution system 110, which includes the video encoding system 102. Additionally, the client devices 106a-106n include client applications 112a-112n.

As shown in FIG. 1, the server device(s) 104 include the media distribution system 110. The media distribution system 110 can include, or be part of, one or more systems that provide access to digital media content to a plurality of users. For example, the media distribution system 110 can provide digital video for streaming or otherwise accessing for viewing over a network connection (e.g., via the network 108) by a plurality of different client devices (e.g., the client devices 106a-106n). In some embodiments, the media distribution system 110 can include a database including one or more types of digital media content accessible to client devices. Additionally, the media distribution system 110 can access digital media content from one or more third-party sources (e.g., a third-party database or a client device) to provide to one or more client devices.

As illustrated in FIG. 1, the media distribution system 110 includes the video encoding system 102 for generating digital video encodings. In particular, because client devices can have different computing, display, and network connection characteristics, the media distribution system 110 can utilize the video encoding system 110 to generate different digital video encodings at different bitrates to provide to client devices based on their respective capabilities. For example, as previously mentioned, by generating an encoding of a digital video at a specific bitrate for devices with specific capabilities prior to receiving a request for the digital video, the video encoding system 102 can reduce the time from the request to deliver the digital video to a requesting client device. Additionally, providing digital videos with different encoding bitrates can provide digital videos that are optimized for displaying at each recipient client device over time (e.g., as connection rates or client device characteristics change).

To generate digital video encodings for a digital video, the video encoding system 102 can process the digital video to determine a downsampling distortion of the digital video. For example, the video encoding system 102 can compare the digital video to a copy of the digital video that has been downsampled and then upsampled to determine a measure of distortion resulting from downsampling the digital video. The video encoding system 102 can then utilize the downsampling distortion to determine a constant rate factor transition threshold. Specifically, the video encoding system 102 can generate a first set of digital video encodings below the constant rate factor transition threshold and a second set of digital video encodings at or above the constant rate factor transition threshold.

According to one or more embodiments, when delivering a digital video to different client devices, the video encoding system 102 can use information about the client devices to determine appropriate video settings of the digital video for each client device. For instance, the video encoding system 102 can obtain device information from a client device (e.g., client device 108b or client device 108n) such as, but not limited to, a device type, display size, processing capabilities, and a network connection speed. The media distribution system 110 (or the video encoding system 102) can then select a digital video encoding that corresponds to the received device information and provide the selected digital video encoding to the client device.

In one or more embodiments, the server device(s) 104 include a variety of computing devices, including those described below with reference to FIG. 9. For example, the server device(s) 104 can include one or more servers for storing and processing data associated with digital video analysis and digital video encoding. The server device(s) 104 can also include a plurality of computing devices in communication with each other, such as in a distributed storage environment. Furthermore, the server device(s) 104 can include devices and/or components in connection with one or more machine-learning models (e.g., a machine-learning model to analyze historical downsampling distortions and historical constant rate factor thresholds to determine a distortion-threshold curve) and training data for training the machine-learning model(s). In some embodiments, the server device(s) 104 comprise a content server. The server device(s) 104 can also comprise an application server, a communication server, a web-hosting server, a social networking server, a digital content campaign server, or a digital communication management server.

As mentioned, the server device(s) 104 can include components associated with machine-learning models and training data for training one or more machine-learning models. In one or more embodiments, the server device(s) 104 (e.g., implementing the video encoding system 102 or another system) train machine-learning models to determine constant rate factor transition thresholds for digital video received from one or more sources. In addition to utilizing one or more training datasets, the server device(s) 104 can utilize a verification dataset and a testing dataset for verifying and testing training of the machine-learning model(s), respectively.

In addition, as shown in FIG. 1, the system environment 100 includes the client devices 106a-106n. Each of the client devices 106a-106n can include, but is not limited to, a mobile device (e.g., smartphone or tablet), a laptop, a desktop, including those explained below with reference to FIG. 9. Furthermore, although not shown in FIG. 1, the client devices 106a-106n can be operated by one or more users (e.g., a user included in, or associated with, the system environment 100) to perform a variety of functions. In particular, the client devices 106a-106n can perform functions such as, but not limited to, accessing, viewing, and interacting with a variety of digital content (e.g., digital video) via the client applications 112a-112n. The client devices 106a-106n can also use the client applications 112a-112n to perform functions for generating or capturing digital video content and uploading the digital video content to the media distribution system 110 and the video encoding system 102 in connection with encoding and sharing the digital video content with one or more other client devices. For example, the client devices 106a-106n can communicate with the server device(s) 104 via the network 108 to provide digital video content to the server device(s) 104. Additionally, the client devices 106a-106n can communicate with the server device(s) 104 via the network 108 to receive digital video content from the server device(s) 104. As illustrated, the system environment 100 can include a different number of client devices interacting with the media distribution system 110 to send and/or receive digital media content.

Additionally, as shown in FIG. 1, the system environment 100 includes the network 108. The network 108 can enable communication between components of the system environment 100. In one or more embodiments, the network 108 may include the Internet or World Wide Web. Additionally, the network 108 can include various types of networks that use various communication technology and protocols, such as a corporate intranet, a virtual private network (VPN), a local area network (LAN), a wireless local network (WLAN), a cellular network, a wide area network (WAN), a metropolitan area network (MAN), or a combination of two or more such networks. Indeed, the server device(s) 104 and the client device 106 may communicate via the network using a variety of communication platforms and technologies suitable for transporting data and/or communication signals, including any known communication technologies, devices, media, and protocols supportive of data communications, examples of which are described with reference to FIG. 9.

Although FIG. 1 illustrates the server device(s) 104 and the client devices 106a-106n communicating via the network 108, the various components of the video encoding system 102 can communicate and/or interact via other methods (e.g., the server device(s) 104 and the client devices 106a-106n can communicate directly). Furthermore, although FIG. 1 illustrates the video encoding system 102 being implemented by a particular component and/or device within the system environment 100, the video encoding system 102 can be implemented, in whole or in part, by other computing devices and/or components in the system environment 100 (e.g., the client devices 106a-106c). Additionally, media content databases including digital video may be implemented at the server device(s) 104 or at one or more other server devices or systems.

Figure 2A:
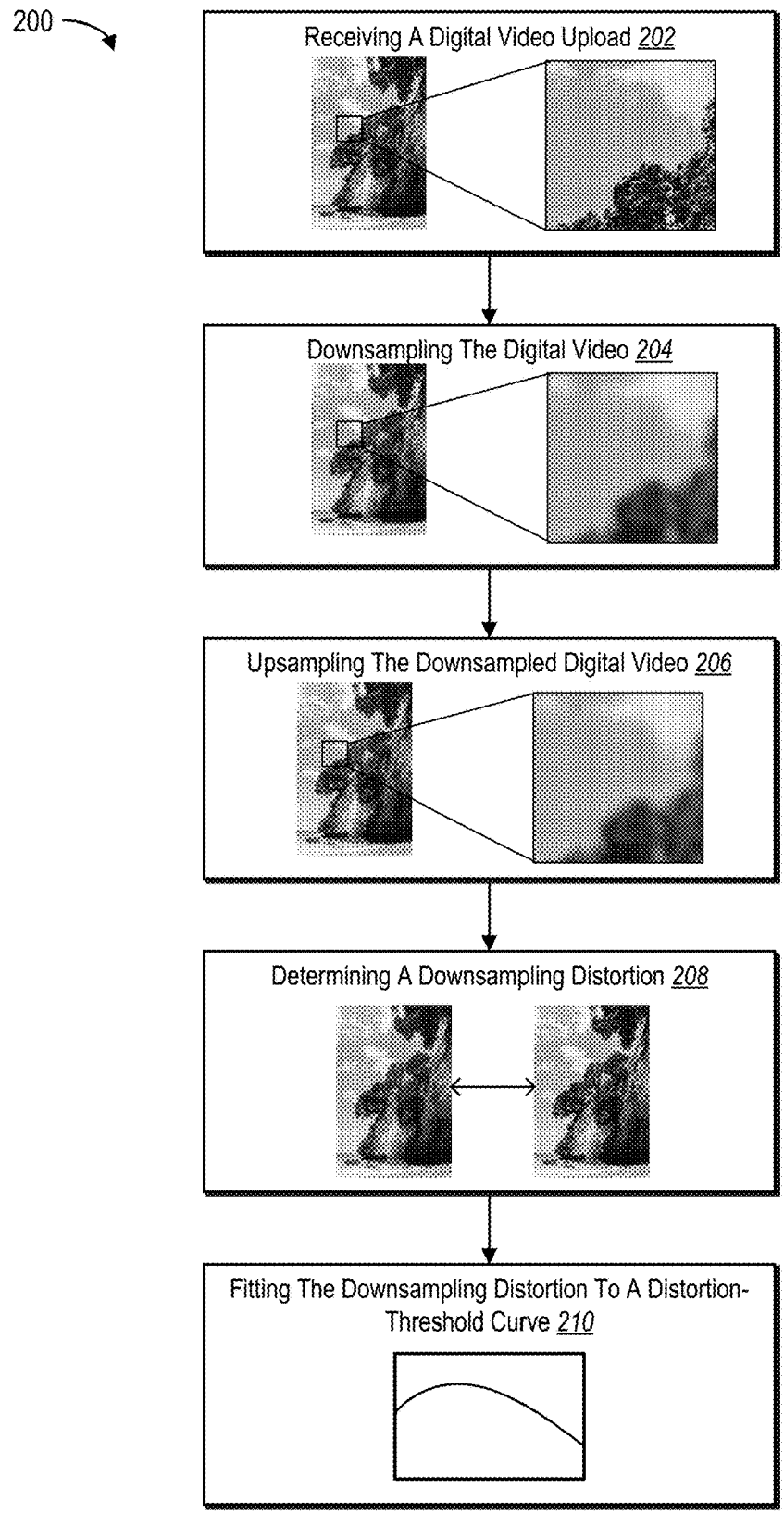
FIG. 2A illustrates a flowchart diagram of a process for utilizing a downsampling distortion to determine a constant rate factor transition threshold for selecting encoding parameters in accordance with one or more implementations.
Figure 2B:
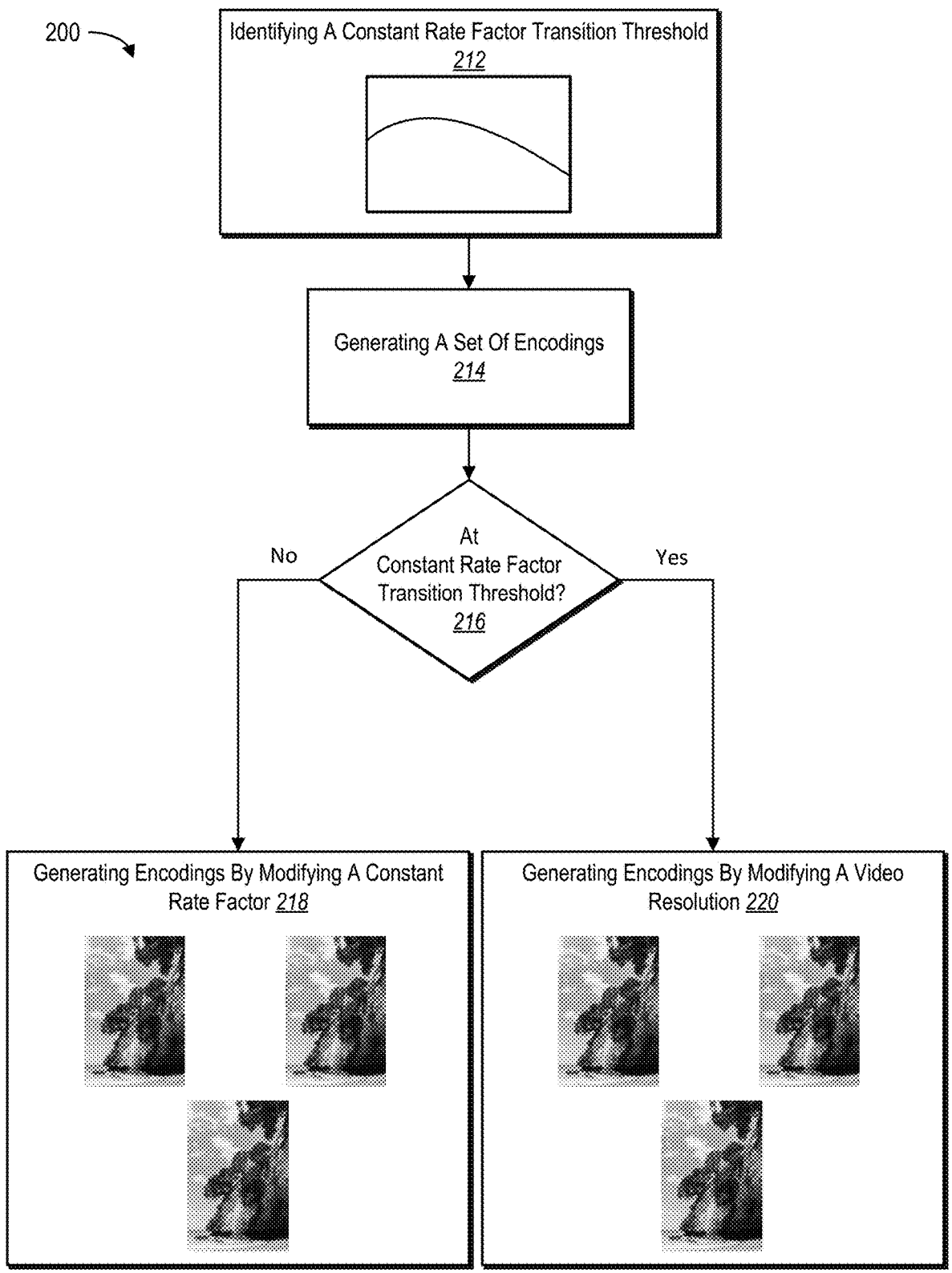
FIG. 2B illustrates a flowchart diagram of a process for generating sets of digital video encodings based on a constant rate factor transition threshold in accordance with one or more implementations.

As mentioned above, the video encoding system 102 can generate a plurality of digital video encodings of a digital video at a plurality of different. FIGS. 2A-2B illustrate an overview of a process by which the video encoding system 102 generates sets of digital video encodings based on a downsampling distortion of a digital video and a constant rate factor transition threshold. Specifically, FIG. 2A illustrates that the video encoding system 102 can determine a downsampling distortion for a digital video. FIG. 2B illustrates that the video encoding system 102 can utilize the downsampling distortion to determine a constant rate factor transition threshold and then generate digital video encodings based on the constant rate factor threshold.

As illustrated in FIG. 2A, the video encoding system 102 can perform acts 200. Specifically, the acts 200 include an act 202 of receiving a digital video upload. For example, the video encoding system 102 can receive a digital video uploaded from a client device to provide access to the digital video to one or more other client devices. As mentioned previously, the video encoding system 102 can generate digital video encodings of the uploaded digital video at different bitrates to provide to client devices based on their computing resources, display capabilities, and/or network connectivity. In at least some embodiments, the digital video upload can include a digital video captured by a single user via a client device such as a smartphone or digital camera and uploaded to a cloud storage or social networking system. In alternative embodiments, the digital video upload can include a digital video such as a movie or television show captured using one or more image capture devices and processed using one or more additional digital video processing techniques prior to upload.

In connection with receiving a digital video uploaded by a client device, the video encoding system 102 can process the digital video to generate a plurality of digital video encodings to provide to different client devices. FIG. 2A illustrates that the acts 200 include an act 204 of downsampling the digital video. In particular, the video encoding system 102 can generate a downsampled version of the digital video by reducing a resolution of the digital video. For instance, in one or more embodiments, the video encoding system 102 can downsample the digital video to half (or approximately half) of the resolution of the original resolution.

After generating the downsampled version of the digital video, FIG. 2A illustrates that the acts 200 include an act 206 of upsampling the downsampled digital video. Specifically, the video encoding system 102 can scale the resolution of the downsampled digital video to a higher resolution. In some embodiments, the video encoding system 102 can scale the resolution of the downsampled digital video to the original resolution of the digital video (e.g., the resolution of the digital video uploaded to the video encoding system 102).

Additionally, FIG. 2A illustrates that the acts 200 include an act 208 of determining a downsampling distortion. The video encoding system 102 can determine the downsampling distortion for the digital video by comparing the digital video uploaded to the video encoding system 102 to the upsampled digital video. For example, the video encoding system 102 can compare the original digital video to the version of the digital video that has been downsampled and then upsampled. Because downsampling digital images (e.g., digital video frames) can result in loss of visual information due to the reduced number of pixels available to store the information, the video encoding system 102 can determine the downsampling distortion by quantifying the loss of visual information resulting from downsampling and then upsampling the digital video. In some embodiments, as described in more detail below, the video encoding system 102 can determine a measure of the downsampling distortion by applying a filter to the digital video and the upsampled digital video to determine a structural similarity.

Upon determining the downsampling distortion, FIG. 2A shows that the acts 200 include an act 210 of fitting the downsampling distortion to a distortion-threshold curve. In one or more embodiments, the video encoding system 102 utilizes the downsampling distortion previously determined for the digital video to find where the digital video falls on a curve (e.g., a curve that indicates a relationship between downsampling distortion values and constant rate factor transition threshold values). As mentioned, the video encoding system 102 can generate the distortion-threshold curve by processing a plurality of digital videos to determine the relationship between downsampling distortion and constant rate factor transition thresholds.

FIG. 2B illustrates that the acts 200 include an act 212 of identifying a constant rate factor transition threshold. Specifically, the video encoding system 102 can identify the constant rate factor transition threshold based on fitting the downsampling distortion to the distortion threshold curve. For instance, the video encoding system 102 can determine a mapping between the downsampling distortion of the digital video and a constant rate factor transition threshold by determining a position of the downsampling distortion on the distortion-threshold curve and identifying the constant rate factor transition threshold at the corresponding position on the distortion-threshold curve.

As shown in FIG. 2B, the acts 200 further include an act 214 of generating a set of encodings. As described previously, the video encoding system 102 can generate digital video encodings to provide to different client devices based on information associated with the client devices. To illustrate, the video encoding system 102 can generate digital video encodings with lower bitrates to provide to client devices with lower network connection speeds and digital video encodings with higher bitrates to provide to client devices with higher network connection speeds. Additionally, the video encoding system 102 can take into account a display size of the client devices (or of client applications associated with the client devices) when determining a particular digital video encoding for a client device. Furthermore, in some embodiments, the video encoding system 102 can utilize adaptive bitrate streaming to dynamically select individual video segments of a digital video in real-time according to varying network conditions, such that the bitrate of a digital video provided to a client device may change.

To generate the set of encodings, FIG. 2B illustrates that the acts 200 include an act 216 of determining whether a constant rate factor is at the constant rate factor transition threshold. Furthermore, the acts 200 include an act 218 of generating encodings by modifying a constant rate factor if the constant rate factor is not at the constant rate factor transition threshold. Additionally, the acts 200 include an act 220 of generating encodings by modifying a video resolution if the constant rate factor is at (or above) the constant rate factor transition threshold. Thus, FIG. 2B illustrates that the video encoding system 102 generates separate sets of digital video encodings based on a constant rate factor transition threshold.

According to one or more embodiments, the video encoding system 102 generates a first set of video encodings by utilizing a first plurality of encoding parameters by modifying (e.g., increasing) a value of constant rate factor associated with a digital video encoder to generate encodings at different bitrates. Specifically, the constant rate factor can include a setting that applies a specific quality control when compressing a digital video using a digital video encoder. For example, when encoding a digital video, setting a specific value (e.g., from 0 to 51) for a constant rate factor can cause the video encoder to encode each frame of the digital video to maintain a level of perceived quality based on the value of the constant rate factor. By changing the constant rate factor, the video encoding system can change the encoding quality for a particular digital video encoding. In particular, lower values of constant rate factor result in higher quality digital video encodings with higher file sizes (e.g., higher encoding bitrates), while higher values of constant rate factor result in lower quality digital video encodings and lower file sizes (e.g., lower encoding bitrates). Furthermore, the video encoding system 102 can generate the first set of digital video encodings using a single resolution, such that each of the digital video encodings in the first set of encodings has the same resolution.

Once the constant rate factor is at or above the constant rate factor transition threshold, the video encoding system 102 can generate a second set of video encodings by utilizing a second plurality of encoding parameters including modifying (e.g., decreasing) a resolution of the video encodings via the digital video encoder. In particular, as mentioned, the constant rate factor transition threshold may indicate an approximate value of constant rate factor at which increasing the constant rate factor results in decreased quality of encodings as compared to modifying other encoding parameters (e.g., the resolution). Accordingly, the video encoding system 102 can generate the second set of digital video encodings by modifying the resolution of the different encodings. In addition, the video encoding system 102 can generate the second set of digital video encodings by utilizing a single constant rate factor with a value at (or above) the constant rate factor transition threshold. In some embodiments, the video encoding system 102 uses a constant rate factor value equal to the constant rate factor transition threshold.

Figure 3B:
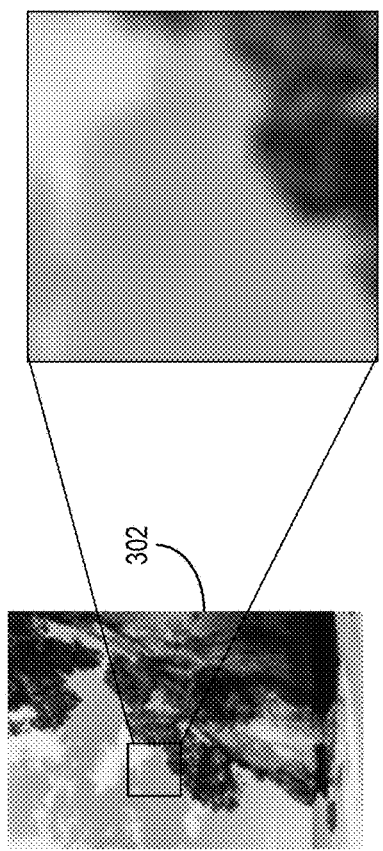
FIGS. 3A-3C illustrate examples of an input digital video, a downsampled digital video, and an upsampled digital video in accordance with one or more implementations.
Figure 3A:
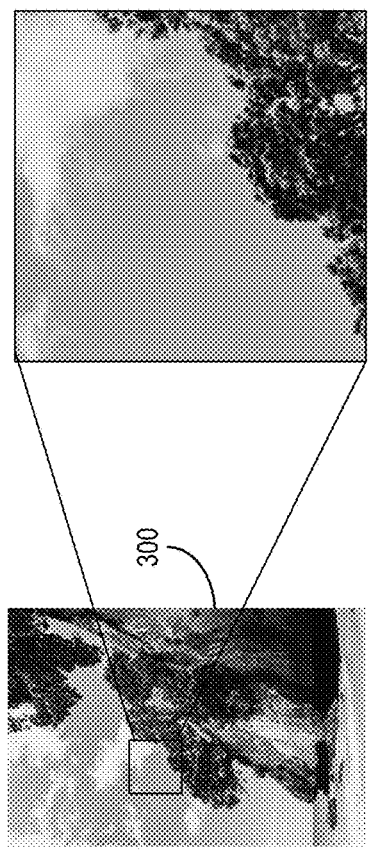
Figure 3C:
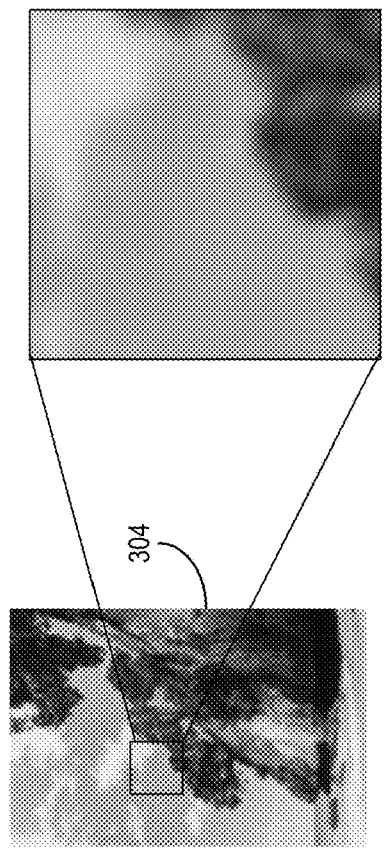

As described above in relation to FIG. 2A, the video encoding system 102 performs an operation for determining a downsampled distortion for a digital video by comparing the digital video to a version of the digital video that has been downsampled and then upsampled. FIGS. 3A-3C illustrate examples of a digital video, a downsampled digital video, and an upsampled digital video. Specifically, FIG. 3A illustrates an input digital video 300, FIG. 3B illustrates a downsampled digital video 302, and FIG. 3C illustrates an upsampled digital video in accordance with one or more embodiments.

In one or more embodiments, the video encoding system 102 can identify an input digital video 300, shown in FIG. 3A, for generating a plurality of digital video encodings. To illustrate, the video encoding system 102 can identify a full-resolution digital video that has a resolution of 720× 1080 pixels uploaded to the media distribution system 110 of FIG. 1. Although FIG. 3A illustrates that the input digital video 300 has a specific resolution, the input digital video 300 can have any resolution.

The video encoding system 102 can utilize digital video processing to process one or more sequences of video frames in the digital video. For example, the video encoding system 102 can downsample the input digital video 300 to reduce a resolution of the input digital video. Reducing the resolution can thus produce a downsampled digital video 302, illustrated in FIG. 3B. In one or more embodiments, the video encoding system 102 can downsample the input digital video 300 to half (or approximately half) of the original resolution. Thus, the video encoding system 102 can generate the downsampled digital video 302 to have a resolution of 360×540 pixels. In other embodiments, the video encoding system 102 can generate the downsampled digital video 302 to have a different resolution that is lower than the original resolution (e.g., 75%, 60%, or 40%).

Depending on the complexity of the content in the input digital video 300, downsampling the input digital video 300 to generate the downsampled digital video 302 can result in varying degrees of distortion. More specifically, downsampling digital images (e.g., individual video frames) can result in loss of visual information due to the reduced number of pixels available to represent the visual information. For instance, images with high frequency data (e.g., images with pixel values that change rapidly over space due to high amounts of fine details) can experience higher degradation of visual information in response to downsampling than images with low frequency data (e.g., images with pixel values that change slowly over space due to low amounts of fine details). Thus, downsampling a digital video that has many fine details can result in a significant amount of visual degradation. As shown in FIG. 3B, downsampling the input digital video 300 to generate the downsampled digital video 302 can result in noticeable loss of visual detail in some areas and not in other areas.

After generating the downsampled digital video 302, the video encoding system 102 can then upsample the downsampled digital video 302 to generate the upsampled digital video 304. In some embodiments, the video encoding system 102 can generate the upsampled digital video 304 by scaling the resolution of the downsampled digital video 302 to the resolution of the input digital video 300. Accordingly, as illustrated in FIG. 3C, the video encoding system 102 can generate the upsampled digital video 304 by increasing the resolution of the downsampled digital video 302 from 360×540 pixels to 720×1080 pixels, which is the same resolution as the input digital video 300. As shown, even though the upsampled digital video 304 has the same resolution as the input digital video 300, the upsampled digital video 304 has loss of visual information because the upsampled digital video 304 lost the visual information when the video encoding system 102 downsampled the input digital video 300. Although FIG. 3C illustrates that the upsampled digital video 304 has the same resolution as the input digital video 300, the video encoding system 102 may generate an upsampled digital video that has a different resolution than the input digital video 300. Alternatively, the video encoding system 102 may not upsample the downsampled digital video 302 and may instead compare the downsampled digital video 302 to the input digital video 300 using the processes described below.

Figure 4:
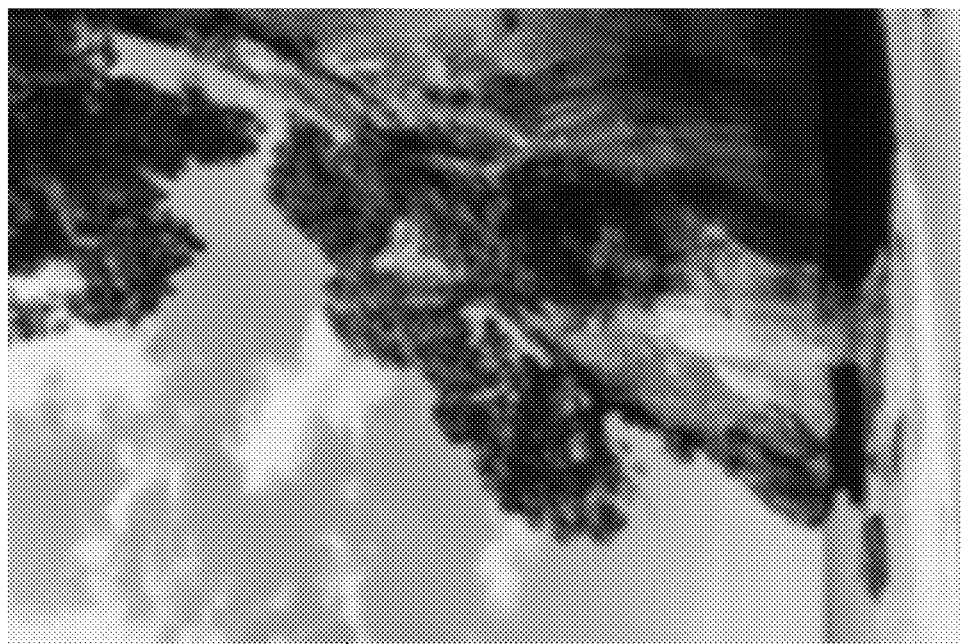
FIG. 4 illustrates digital videos during a process for determining a downsampling distortion for a digital video in accordance with one or more implementations.
Figure 4:
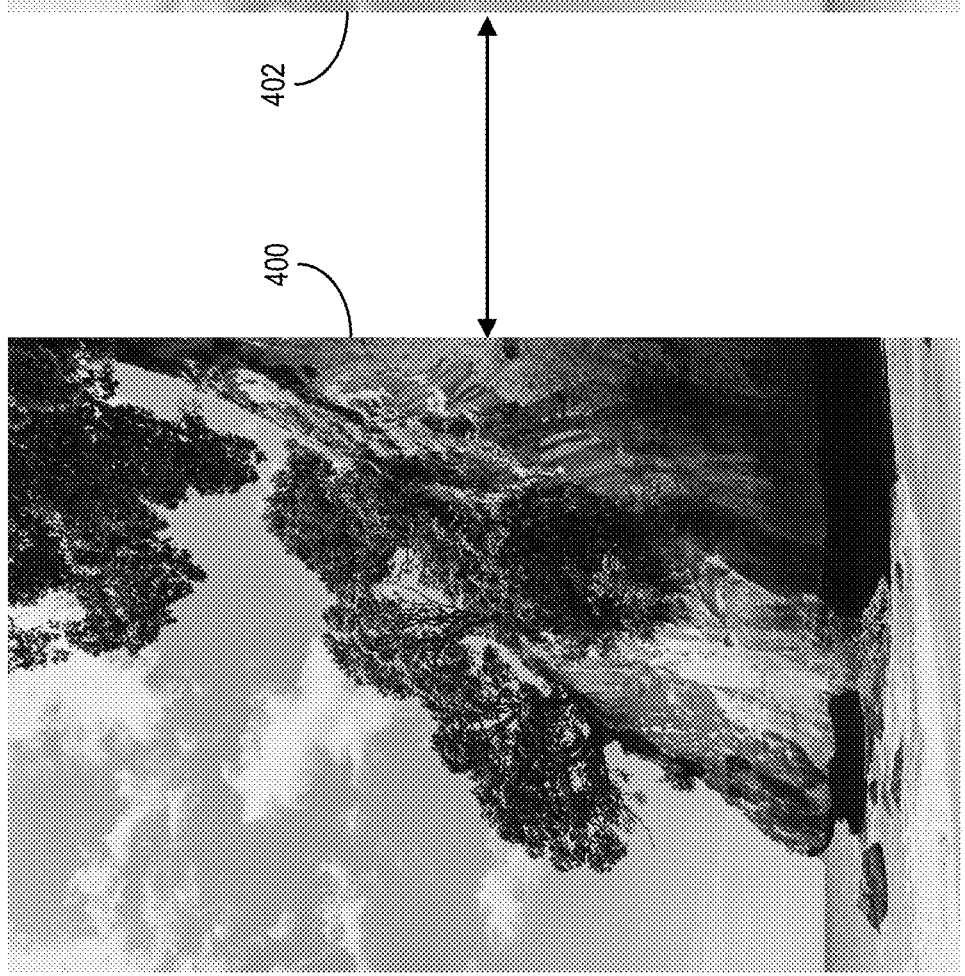

Once the video encoding system 102 has downsampled and then upsampled an input digital video, the video encoding system 102 can determine a downsampling distortion for the input digital video. FIG. 4 illustrates an embodiment of the video encoding system 102 using one or more digital video processes to compare an input digital video 400 to an upsampled digital video 402. Specifically, the video encoding system 102 can determine the downsampling distortion based on comparing the input digital video 400 to the upsampled digital video 402 to determine a measure or value of data loss resulting from downsampling the input digital video 400.

In one or more embodiments, the video encoding system 102 can determine the downsampling distortion for the input digital video 400 by determining a structural similarity between the input digital video 400 and the upsampled digital video 402. For instance, the video encoding system 102 can compare the input digital video 400 and the upsampled digital video 402 to generate a value representing the structural similarity on a structural similarity index ("SSIM"). In particular, the video encoding system 102 can process digital video frames of the input digital video 400 and the upsampled digital video 402 to generate a value that quantifies the similarity between the digital video frames.

To illustrate, the video encoding system 102 utilizes an SSIM filter available via the FFmpeg codec to determine the downsampling distortion of the input digital video 400. In response to applying the SSIM filter to the input digital video 400 and the upsampled digital video 402, the video encoding system 102 can determine an SSIM value. For example, the SSIM filter can return a decimal value up to 1, in which a value of 1 indicates identical digital videos (i.e., no downsampling distortion). Additionally, in one or more embodiments, an SSIM value of 0.9 can indicate some quality degradation, a value of 0.8 can indicate more significant quality degradation, etc., down to 0, which indicates no correlation between the processed video sequences.

As mentioned previously, the video encoding system 102 can utilize a downsampling distortion to determine a constant rate factor transition threshold for generating a plurality of digital video encodings. In one or more embodiments, downsampling distortion of a digital video is highly correlated to a shape of a convex hull curve. FIG. 5A illustrates an example convex hull curve 500 for a digital video. As shown, the convex hull curve 500 depicts a relationship between encoding bitrates (x-axis) and quality loss based on luma structural similarity at an input resolution (y-axis) of the digital video. More specifically, the video encoding system 102 plotted a plurality of combinations of constant rate factors and resolutions within the convex hull curve 500. For each sample, the video encoding system 102 determined a quality score and a quality loss based on the input digital video characteristics to determine the convex hull curve 500 for the digital video.

As illustrated, different combinations of constant rate factor and compression result in different combinations of bitrates and quality loss. Indeed, each point illustrated in FIG. 5A reflects the bitrate and quality loss resulting from a constant rate factor and compression combination. The convex hull reflects the most optimal of these data points (e.g., the data points with the lowest quality loss for any particular bitrate). Thus, the convex hull for any particular digital image reflects the optimal combination of constant rate factor and resolution to achieve the highest quality digital video across different bitrates.

Accordingly, with a convex hull in hand, the video encoding system 102 could determine a plurality of digital video encodings at a plurality of bitrates that correspond to the convex hull curve. Indeed, generating a set of digital video encodings based on the convex hull curve of a digital video can improve encoding efficiency by 15-20% over conventional adaptive bitrate methods. That said, as reflected in the number of tested points shown in FIG. 5A, it is computationally expensive to determine the precise convex hull for every input digital video. Thus, in one or more embodiments, the video encoding system 102 selects a constant rate factor transition threshold to approximate the shape of the convex hull.

Specifically, according to one or more embodiments, the video encoding system 102 can utilize a relationship between the downsampling distortion and constant rate factor to determine constant rate factor transition thresholds for different downsampling distortions. In particular, FIG. 5B illustrates a distortion-threshold curve 502 that shows a corresponding constant rate factor transition threshold for a plurality of SSIM values. In some embodiments, the video encoding system 102 can determine the constant rate factor transition thresholds that most closely approximate to convex hull curves for the digital videos. For instance, the video encoding system 102 can determine, for a given SSIM value, a value of constant rate factor at which modifying the constant rate factor for encoding results in approximately equal quality loss to modifying a resolution of the digital video.

To determine the relationships between downsampling distortion and constant rate factor transition thresholds, the video encoding system 102 can process historical data associated with a plurality of digital videos. For example, the video encoding system 102 (or another system) can process the plurality of digital videos to determine historical downsampling distortions. The video encoding system 102 can also process the plurality of digital videos to determine convex hulls for the plurality of digital videos. Based on the convex hull, the video encoding system 102 can determine a constant rate factor transition threshold for each of the plurality of digital videos. Specifically, the video encoding system 102 can select a constant rate factor transition threshold that best aligns or fits to the convex hull.

To illustrate, the video encoding system 102 can select a constant rate factor transition threshold for one of these historical digital videos with a known convex hull and then apply the constant rate factor transition threshold to select encoding parameters. The video encoding system 102 can compare the selected encoding parameters with the actual convex hull. If the selected encoding parameters align with the actual convex hull, the constant rate factor transition thresholds is an accurate approximation. The video encoding system 102 can iteratively select different constant rate factor transition thresholds for a historical input digital video and identify the constant rate factor transition threshold that best approximates the convex hull.

The video encoding system 102 can utilize a variety of models to select the constant rate factor transition threshold. In some embodiments, as just discussed, the video encoding system 102 can utilize a similarity comparison model between an observed convex hull and encodings resulting from different selected constant rate transition thresholds. In some embodiments, the video encoding system 102 can train a supervised machine learning model to predict constant rate factor transition thresholds based on downsampling distortions.

Upon identifying downsampling distortions and constant rate factor transition thresholds for historical digital videos, the video encoding system 102 can generate the distortion-threshold curve 502. For example, the video encoding system 102 can determine a plurality of data points reflecting downsampling distortion/constant rate factor transition threshold pairs for historical digital videos. The video encoding system 102 can then generate a best-fit curve reflecting the data points. Thus, the video encoding system 102 can determine that digital videos having similar downsampling distortions can also typically correspond to similar constant rate factor transition thresholds for generating digital video encodings that most closely follow convex hull curves for the digital videos.

As illustrated in FIG. 5B, the video encoding system 102 can match any particular downsampling distortion of a digital video to a constant rate factor transition threshold using the distortion-threshold curve 502. For example, in response to determining that the digital video has a high SSIM value (e.g., 0.98) indicating a low measure of downsampling distortion, the video encoding system 102 can determine a lower constant rate factor transition threshold (e.g., 31) for encoding the digital video. Conversely, in response to determining that a digital video has a lower SSIM value (e.g., 0.93) indicating a higher measure of downsampling distortion, the video encoding system 102 can determine a higher constant rate factor transition threshold (e.g., 36) for encoding the digital video.

Figure 5C:
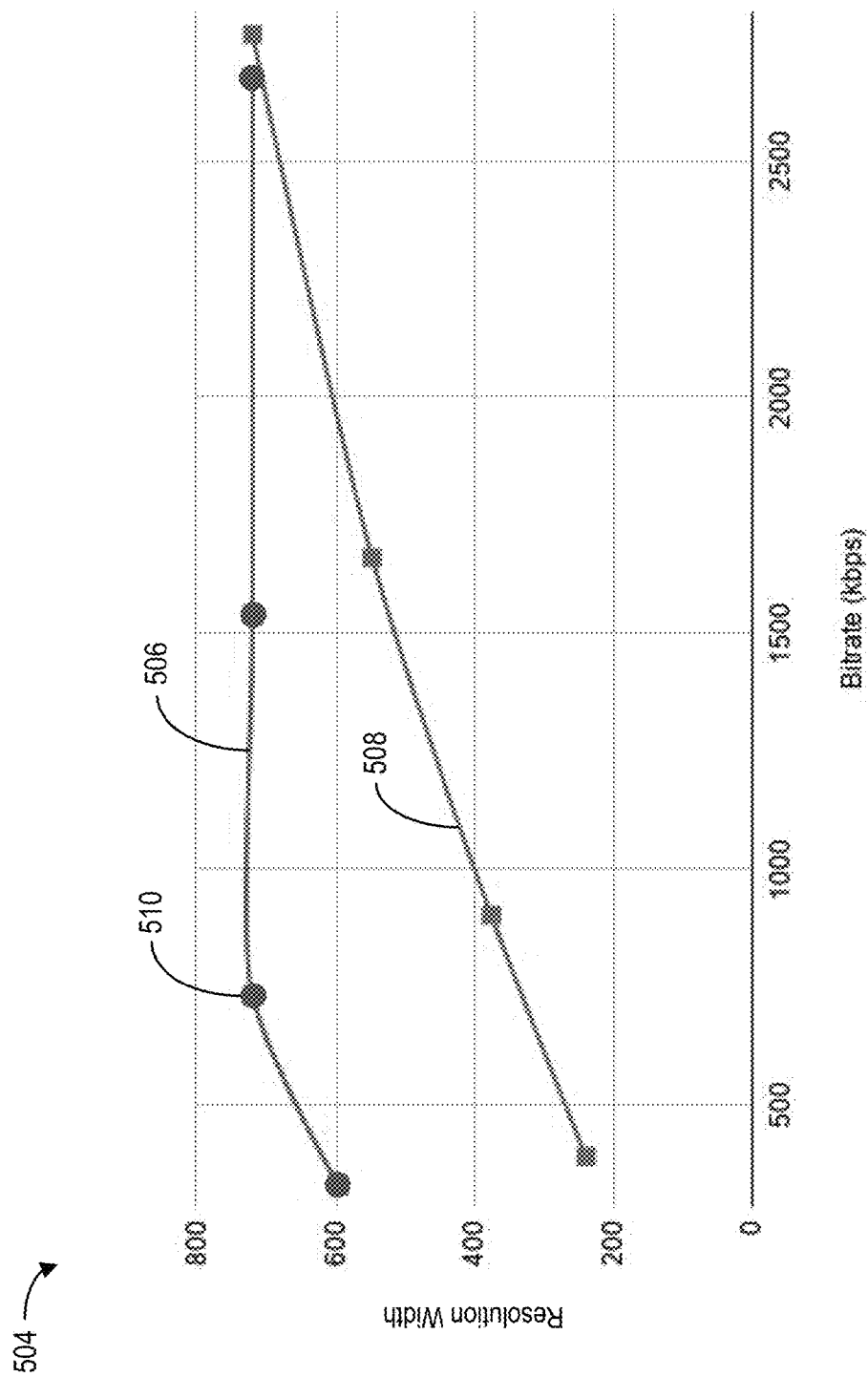
FIG. 5C illustrates a graph depicting digital video encodings generated by the video encoding system relative to video encodings generated by a conventional system in accordance with one or more implementations.

After fitting the downsampling distortion of a digital video to the distortion-threshold curve for determining a constant rate factor transition threshold, the video encoding system 102 can select encoding parameters for digital video encodings. Specifically, the video encoding system 102 can select separate sets of encoding parameters below the constant rate factor transition threshold and at or above the constant rate factor transition threshold. FIG. 5C illustrates a graph 504 including bitrate-resolution curves based on the video encoding system 102 and a conventional system in accordance with one or more embodiments. More specifically, FIG. 5C illustrates a first bitrate-resolution curve 506 corresponding to encoding parameters for the video encoding system 102 and a second bitrate-resolution curve 508 corresponding to encoding parameters for the conventional system.

As illustrated, the conventional system utilizes a conventional encoding approach that results in applying an adaptive constant rate factor approach with standard mappings between bitrates and encoding resolutions. Indeed, the second bitrate-resolution curve 508 follows a slight curve from low bitrates to high bitrates. Because the second bitrate-resolution curve 508 utilizes standard mappings between bitrates and encoding resolutions (and therefore, constant rate factor values), the conventional approach often results in lower resolutions for the same bitrates. This is a result of not taking the complexity of the video content into account when determining the parameters.

In contrast, FIG. 5C illustrates that by utilizing the constant rate factor transition threshold to select encoding parameters, the video encoding system 102 can generate encodings that have higher resolution at the same bitrates than the conventional systems. Specifically, the video encoding system 102 can select encoding parameters for digital video content with high downsampling distortion that result in several encoding bitrates at the same resolution (e.g., the original input resolution). For example, as shown, the first bitrate-resolution curve 506 includes the constant rate factor transition threshold 510 indicating an inflection point in the first bitrate-resolution curve 506. For values of constant rate factor below the constant rate factor transition threshold 510, the video encoding system 102 can select encoding parameters that change the value of a constant rate factor while maintaining the same resolution—corresponding to the right-hand side of the first bitrate-resolution curve 506. As shown on the left-hand side of the first bitrate-resolution curve 506, upon reaching the constant rate factor transition threshold 510, the video encoding system 102 can modify an encoding resolution for different encoding bitrates while maintaining a single constant rate factor at the constant rate factor transition threshold 510. In this manner, the video encoding system 102 can generate digital video encodings with different bitrates while optimizing the encoding quality for each digital video encoding.

Figure 5D:
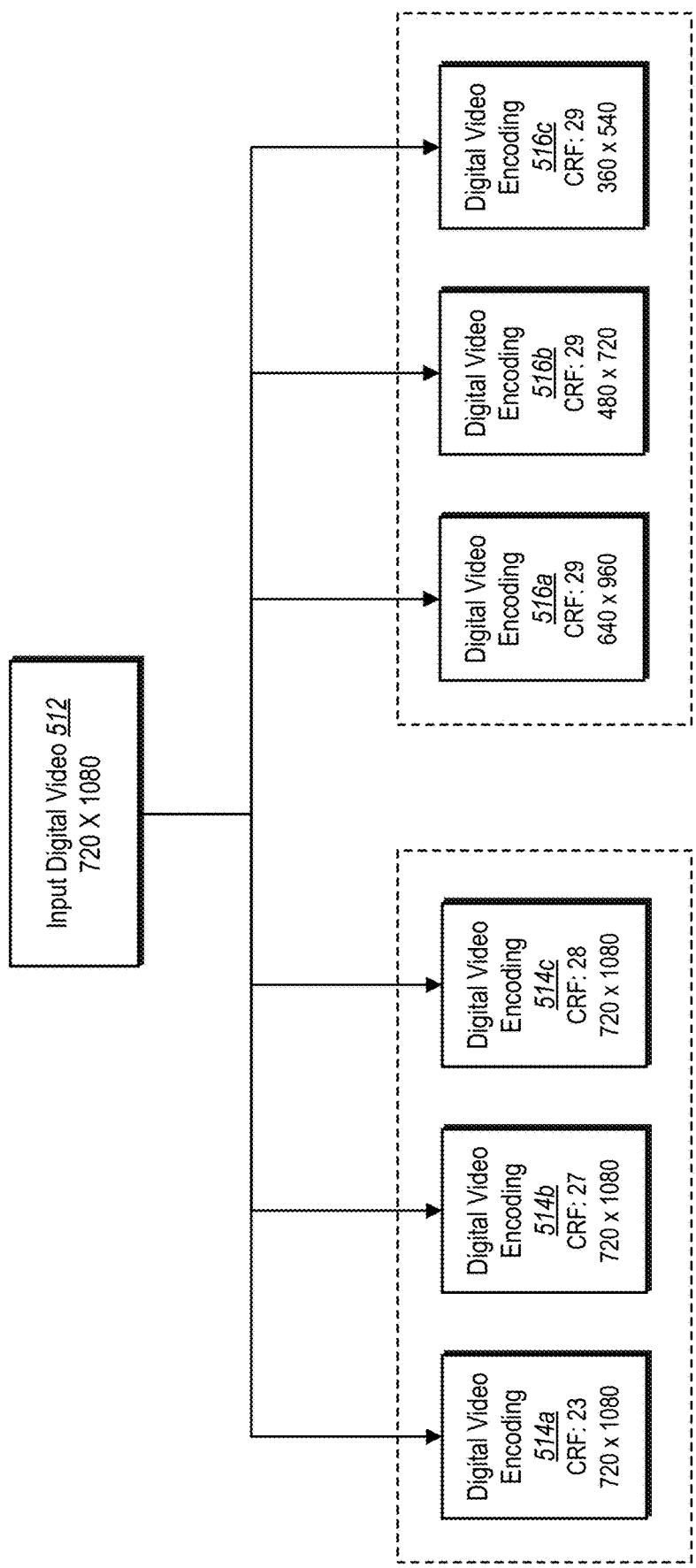
FIG. 5D illustrates two sets of digital video encodings based on a constant rate factor transition threshold in accordance with one or more implementations.

Once the video encoding system 102 has selected the encoding parameters for generating digital video encodings based on a constant rate factor transition threshold, the video encoding system 102 can generate the digital video encodings. FIG. 5D illustrates an embodiment of the video encoding system 102 generating a two-phase bitrate ladder corresponding to a set of digital video encodings according to a constant rate factor transition threshold that the video encoding system 102 determined for an input digital video 512. Specifically, the video encoding system 102 can generate the set of digital video encodings based on two different sets of encoding parameters.

As described previously, the video encoding system 102 can utilize a constant rate factor transition threshold to determine a first set of encoding parameters below the constant rate factor transition threshold and a second set of encoding parameters at or above the constant rate factor transition threshold. For example, the video encoding system 102 can determine a first set of encoding parameters by modifying a constant rate factor for each encoding bitrate. Additionally, the video encoding system 102 can maintain a constant resolution for the first set of encoding parameters.

The video encoding system 102 can then utilize the first set of encoding parameters to generate a first set of digital video encodings (e.g., digital video encodings 514a-514c). In one or more embodiments, the video encoding system 102 utilizes a video encoder to apply encoding parameters from the first set of encoding parameters to the input digital video 512. For example, as shown in FIG. 5D, the video encoding system 102 can apply first encoding parameters including a first constant rate factor and a first resolution (e.g., a resolution of the input digital video 512) to the input digital video 512 to generate a first digital video encoding 514a. The video encoding system 102 can apply second encoding parameters including a second constant rate factor and the first resolution to the input digital video 512 to generate a second digital video encoding 514b. The second constant rate factor may have a higher value than the first constant rate factor. The video encoding system 102 can similarly apply third encoding parameters including a third constant rate factor higher than the first constant rate factor and the second constant rate factor at the first resolution.

By maintaining a fixed resolution for the first set of digital video encodings while modifying the constant rate factor, the video encoding system 102 can create encodings with different bitrates while optimizing the quality of the encodings. For example, when generating the first set of digital video encodings, the video encoding system 102 can control the bitrate of each digital video encoding by incrementing a constant rate factor parameter. The video encoding system 102 can utilize a relationship between the constant rate factor and output bitrate by following the rule of 6, as follows: bitrate~power(2, CRF*(-⅙)), where "CRF" refers to the constant rate factor, indicating that as the value of constant rate factor increases, the bitrate decreases.

Upon reaching (or exceeding) the constant rate factor transition threshold, the video encoding system 102 can utilize the video encoder to apply encoding parameters from the second set of encoding parameters to the input digital video 512. For instance, as illustrated in FIG. 5D, the video encoding system 102 can apply fourth encoding parameters including a fixed constant rate factor and a second resolution to the input digital video 512 to generate a fourth digital video encoding 516a. In one or more embodiments, the fixed constant rate factor is equal to the constant rate factor transition threshold, though in other embodiments, the fixed constant rate factor can be a different value of constant rate factor above the constant rate factor transition threshold. The video encoding system 102 can then apply fifth and sixth encoding parameters including the fixed constant rate factor and successively smaller resolutions to the input digital video 512 to generate a fifth digital video encoding 516b and a sixth digital video encoding 516c, respectively.

Because the video encoding system 102 maintains a fixed constant rate factor for the second set of digital video encodings while modifying the resolution, the video encoding system 102 can continue creating encodings with different bitrates and optimized encoding quality. Specifically, when generating the second set of digital video encodings, the video encoding system 102 can control the resolution of each digital video encoding by decreasing the encoded resolution. The video encoding system 102 can utilize a relationship between the resolution and output bitrate by following the rule of 0.75, as follows: bitrate~power (width*height, 0.75), where "width*height" refers to the constant rate factor, indicating that as the value of resolution decreases, the bitrate decreases.

In an example embodiment, the video encoding system 102 can select encoding parameters for a plurality of digital video encodings for the input digital video 512 by first determining a total number of encodings to generate. For example, the video encoding system 102 can determine the number of encodings to generate based on a plurality of device profiles. For example, the video encoding system 102 can utilize device information including display size information, device processing information, or device network information to determine how many encodings to generate, and at which bitrates, to cover different possible configurations of recipient devices. In at least some embodiments, the number and bitrates of digital video encodings that the video encoding system 102 generates may be the same for every digital video, or they may be different depending on the display size, storage size, and/or downsampling distortion associated with each digital video.

After determining how many digital video encodings and the corresponding bitrates to generate for the input digital video 512, the video encoding system 102 can then determine the specific encoding parameters for each video encoding. In particular, in response to determining that the input digital video 512 has a downsampling distortion corresponding to a constant rate factor transition threshold of 29, the video encoding system 102 can select the encoding parameters according to the constant rate factor transition threshold. To illustrate, the video encoding system 102 can determine the parameters for the first digital video encoding 514a by selecting an initial constant rate factor to use (e.g., as described in more detail below with respect to FIG. 6) and an encoding resolution. As shown, the constant rate factor ("CRF") selected for the first digital video encoding 514a is 23, and the encoding resolution is 720×1080 (the resolution of the input digital image 512) to generate a video encoding with a first identified bitrate.

The video encoding system 102 can then determine the encoding parameters for the second digital video encoding 514b by utilizing the rule of 6 described above. For example, the video encoding system 102 can select encoding parameters for the second digital video encoding 514b with a second identified bitrate according to the previously identified bitrates by determining a second constant rate factor (e.g., 26) with the encoding resolution of 720×1080 that results in the second identified bitrate. Similarly, the video encoding system 102 can select encoding parameters for the third digital video encoding 514c with a third constant rate factor (e.g., 28) and the encoding resolution of 720×1080 resulting in a third identified bitrate.

Upon reaching the constant rate factor transition threshold, the video encoding system 102 can switch to the second phase of video encoding. Specifically, for each of the remaining digital video encodings at the identified bitrates of the bitrate ladder, the video encoding system 102 can select encoding parameters that maintain a fixed constant rate factor. For instance, as shown in FIG. 5D, the video encoding system 102 generates the fourth digital video encoding 516a, the fifth digital video encoding 516b, and the sixth digital video encoding 516c utilizing encoding parameters with the same constant rate factor (29) while varying the encoding resolution. To illustrate, for each subsequent bitrate, the video encoding system 102 can reduce the encoding resolution to generate encodings with successively lower bitrates corresponding to the identified bitrates. As illustrated, the fourth digital video encoding 516a at a fourth identified bitrate has an encoding resolution of 640×960, the fifth digital video encoding 516b at a fifth identified bitrate has an encoding resolution of 480×720, and the sixth digital video encoding 516c at a sixth identified bitrate of 360×540.

Because the constant rate factor transition threshold is specific to the content of each digital video, the video encoding system 102 can select different parameters for each digital video encoding in each two-phase bitrate ladder. For example, for some digital videos, the video encoding system 102 may generate a single digital video encoding at the resolution of the input image and a constant rate factor lower than the constant rate factor transition threshold while generating a plurality of digital video encodings at the constant rate factor transition threshold. For some digital videos, the video encoding system 102 may generate a plurality of digital video encodings below the constant rate factor transition threshold while generating a single digital video encoding at the constant rate factor transition threshold. Furthermore, the number and bitrates of digital video encodings can also be specific to each digital video or to a media channel for distributing the digital videos, which may also result in different combinations of digital video encodings below and at a constant rate factor transition threshold.

In one or more additional embodiments, the video encoding system 102 can utilize a segmented approach to encoding digital videos. For example, the video encoding system 102 can analyze different portions of a digital video to determine downsampling distortion for each portion. For example, the video encoding system 102 can analyze a digital video as a whole and track downsampling distortions for different portions of the digital video (e.g., using windows of video frames). The video encoding system 102 can then group adjacent windows of video frames that have similar downsampling distortion values, such as based on portions that fall within predefined bins corresponding to similar distortion values. Alternatively, the video encoding system 102 can divide a digital video into a plurality of portions having an equal number (or approximately equal number) of video frames and then analyze the portions individually. The video encoding system 102 can then generate a two-phase bitrate ladder for each separate portion based on the corresponding downsampling distortion. Thus, the video encoding system 102 can encode a single digital video utilizing different sets of encoding parameters for different segments. This can be especially useful for longer digital videos in which the content complexity of the digital videos changes throughout different segments of the digital videos.

For example, in one or more embodiments, the video encoding system 102 can determine that a first portion of the input digital video 512 includes a first downsampling distortion and a second portion of the input digital video 512 includes a second downsampling distortion. Each portion may include the same number of video frames or a different number of video frames. In response to determining the first and second downsampling distortions, the video encoding system 102 can also determine a first constant rate factor transition threshold and a second constant rate factor transition threshold, respectively.

Furthermore, consistent with the encoding process described above, the video encoding system 102 can determine a two-phase bitrate ladder for the first portion of the digital video and a different two-phase bitrate ladder for the second portion of the digital video. Because the constant rate factor transition threshold can be different, the resulting two-phase bitrate ladders can also have different encoding resolutions and/or values of constant rate factor for similar encoding bitrates. When providing the digital video (e.g., a particular encoding bitrate) to a client device, the video encoding system 102 (or media distribution system 110) can provide the generated encodings for a selected bitrate corresponding to the separate portions and then stitching the separate segments together.

Additionally, as discussed, identifying the constant rate factor transition threshold for the input digital video 512 and utilizing the constant rate factor transition threshold to select encoding parameters can generate digital video encodings that approximately follow a convex hull curve for the digital video without first finding the convex hull curve. Furthermore, by identifying the constant rate factor transition threshold according to the downsampling distortion of the input digital video 512, the video encoding system 102 can quickly and efficiently determine the constant rate factor transition threshold without first encoding the input digital video 512 at full or reduced resolution. These improvements significantly reduce the computational cost over conventional methods of determining bitrate ladders.

Figure 6:
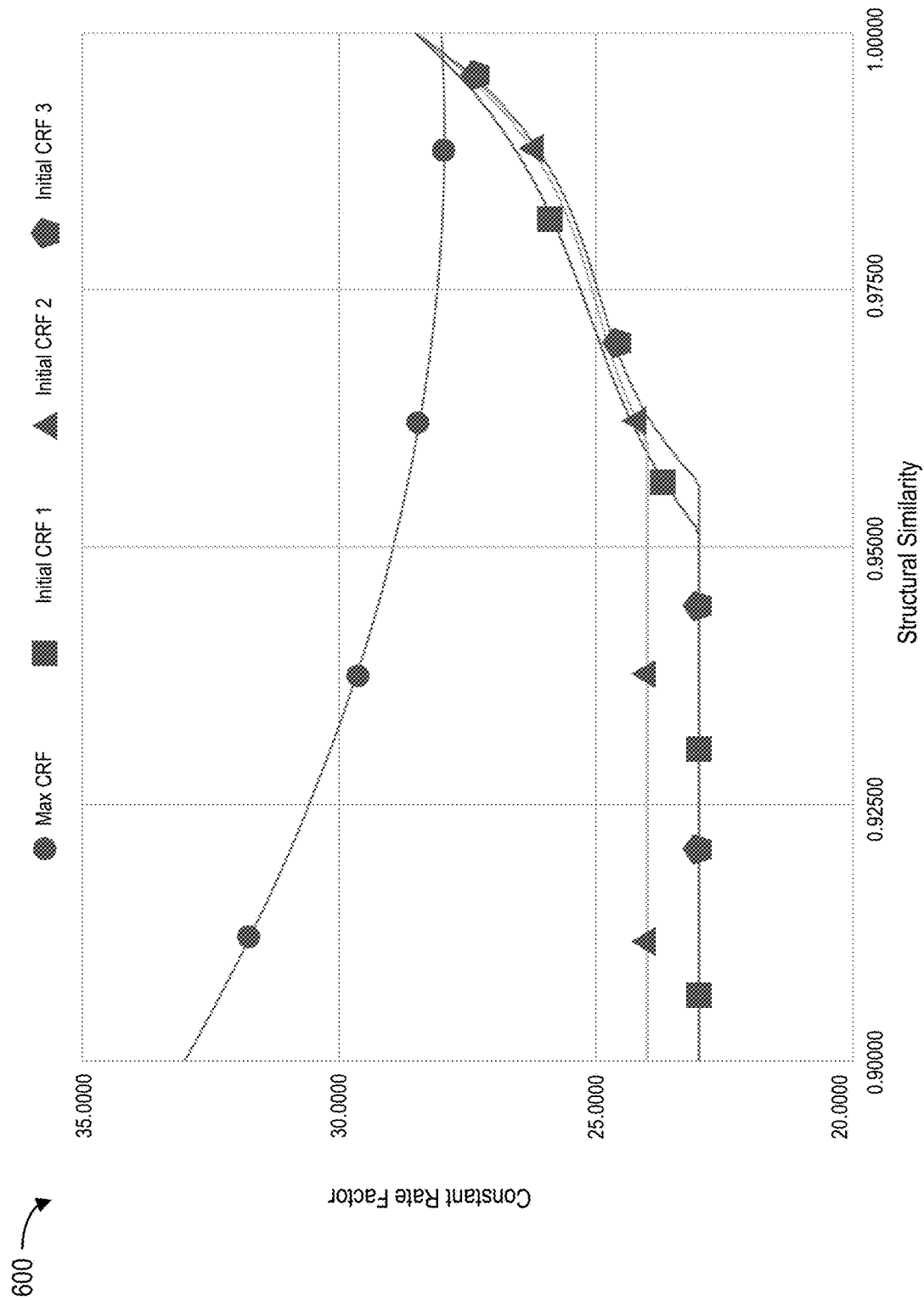
FIG. 6 illustrates a graph depicting a curve of spatial similarity relative to constant rate factor values in accordance with one or more implementations.

In addition to determining the constant rate factor transition threshold, the video encoding system 102 can determine an initial value of constant rate factor. FIG. 6 illustrates a graph depicting a similarity-CRF curve 600 indicating a relationship between a structural similarity (e.g., SSIM value) relative to constant rate factor values for a plurality of media channels. Specifically, as shown in FIG. 6, the video encoding system 102 can determine the initial value constant rate factor based on the downsampling distortion (e.g., SSIM value). For example, based on a number of experiments performed across a plurality of media channels, the video encoding system 102 determined that an initial value of constant rate factor in the range of 23~28.5 produces similar results for initial encoding bitrates to existing adaptive bitrate ladders. Thus, the video encoding system 102 can select the initial value based on the experimental results for a media channel used to distribute a corresponding digital videos. Alternatively, the video encoding system can select the initial value as a fixed value for all digital videos. The experiments performed also indicate that a range of values for maximum value of constant rate factor transition threshold between 28~33 produces improvement upon the existing adaptive bitrate ladders. Furthermore, in some embodiments, higher constant rate factor transition thresholds may also provide improvements upon existing adaptive bitrate ladders depending on the content complexity of the processed digital videos. The experiments also indicate that the video encoding system provides bitrate savings across the entire two-phase bitrate ladder of approximately 8-9% for some media channels and approximately 12-13% for other media channels.

Figure 7:
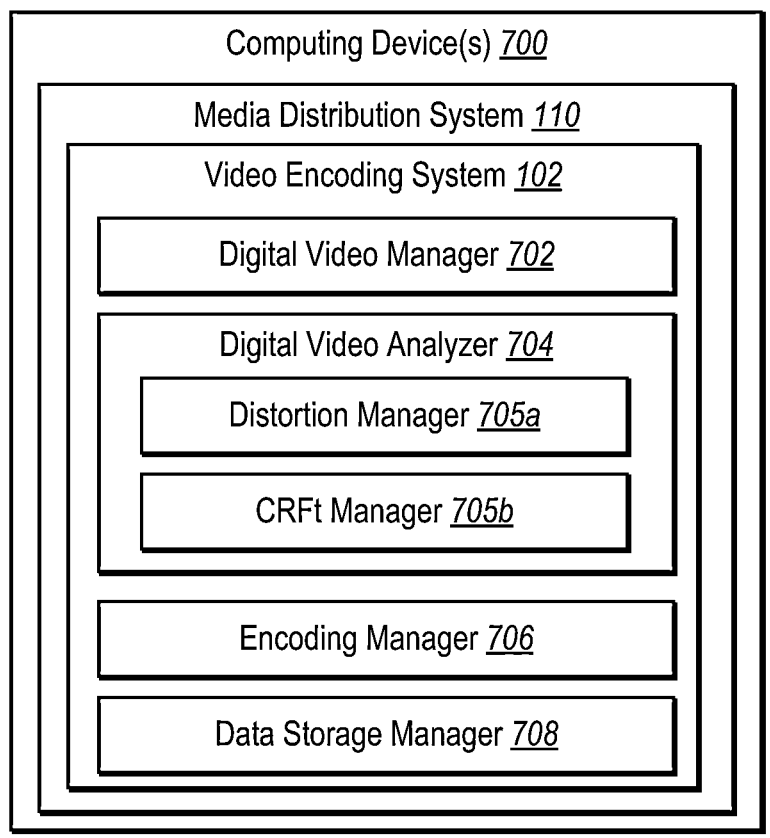
FIG. 7 illustrates a diagram of the video encoding system of FIG. 1 in accordance with one or more implementations.

As described in relation to FIGS. 1-6, the video encoding system 102 can thus perform operations associated with encoding digital videos in a two-phase bitrate ladder according to downsampling distortion of the digital videos. FIG. 7 illustrates a detailed schematic diagram of an embodiment of the video encoding system 102 described above. As shown, the video encoding system 102 can be part of a media distribution system 110 implemented by computing device (s) 700 (e.g., a client device and/or server device as described in FIG. 1, and as further described below in relation to FIG. 9). Additionally, the video encoding system 102 can include a digital video manager 702, a digital video analyzer 704 including a distortion manager 705a and a constant rate factor transition threshold ("CRFt") manager 705b, an encoding manager 706, and a data storage manager 708. The video encoding system 102 can be implemented on any number of computing devices. For example, the video encoding system 102 can be implemented in a distributed system of server devices for processing and distributing digital videos. The video encoding system 102 can also be implemented within one or more additional systems. Alternatively, the video encoding system 102 can be implemented on a single computing device such as a single client device.

In one or more embodiments, each of the components of the video encoding system 102 is in communication with other components using any suitable communication technologies. Additionally, the components of the video encoding system 102 can be in communication with one or more other devices including other computing devices of a user, server devices (e.g., cloud storage devices), licensing servers, or other devices/systems. It will be recognized that although the components of the video encoding system 102 are shown to be separate in FIG. 7, any of the subcomponents may be combined into fewer components, such as into a single component, or divided into more components as may serve a particular implementation. Furthermore, although the components of FIG. 7 are described in connection with the video encoding system 102, at least some of the components for performing operations in conjunction with the video encoding system 102 described herein may be implemented on other devices within the environment.

The components of the video encoding system 102 can include software, hardware, or both. For example, the components of the video encoding system 102 can include one or more instructions stored on a computer-readable storage medium and executable by processors of one or more computing devices (e.g., the computing device(s) 700). When executed by the one or more processors, the computer-executable instructions of the video encoding system 102 can cause the computing device(s) 700 to perform the video processing operations described herein. Alternatively, the components of the video encoding system 102 can include hardware, such as a special purpose processing device to perform a certain function or group of functions. Additionally, or alternatively, the components of the video encoding system 102 can include a combination of computer-executable instructions and hardware.

Furthermore, the components of the video encoding system 102 performing the functions described herein with respect to the video encoding system 102 may, for example, be implemented as part of a stand-alone application, as a module of an application, as a plug-in for applications, as a library function or functions that may be called by other applications, and/or as a cloud-computing model. Thus, the components of the video encoding system 102 may be implemented as part of a stand-alone application on a personal computing device or a mobile device. Alternatively, or additionally, the components of the video encoding system 102 may be implemented in any application that provides digital video processing and/or distribution.

As described above, the video encoding system 102 can include a digital video manager 702 to manage and distribute digital videos. For example, the digital video manager 702 can receive digital videos from one or more client devices or digital video databases. The digital video manager 702 can also provide digital videos (e.g., uploaded digital videos or encoded digital videos) to one or more client devices. The digital video manager 702 can also manage information associated with the digital videos, including ownership and access permissions of the digital videos.

The video encoding system 102 can also include a digital video analyzer 704 to process digital videos in preparation for encoding the digital videos. For instance, the digital video analyzer 704 can process digital videos (e.g., by accessing video metadata) to determine characteristics of the digital videos such as the resolution, storage size, original bitrate, etc. The digital video analyzer 704 can also include a downsampling manager 705a that utilizes downsampling and upsampling processes to generate downsampled and upsampled versions of received digital videos for determining a downsampling distortion for a digital video. For example, a downsampling manager 705a can apply a filter to a digital video to generate the downsampled and upsampled versions of the digital video and then compare the upsampled digital video to the original digital video to determine the downsampling distortion for the digital video. The digital video analyzer 704 can further include a CRFt manager 705b to determine a constant rate factor transition threshold for the digital video. Specifically, the CRFt manager 705b can map the downsampling distortion to a distortion-transition threshold curve to determine the constant rate factor transition threshold for the digital video.

Additionally, the video encoding system 102 can include an encoding manager 706 to generate digital video encodings. Specifically, the encoding manager 706 can utilize a constant rate factor transition threshold for a digital video from the CRFt manager 705b to select encoding parameters for a two-phase bitrate ladder. The encoding manager 706 can then apply the selected encoding parameters to generate sets of digital video encodings based on the constant rate factor transition threshold for the digital video.

Additionally, the video encoding system 102 also includes a data storage manager 708 (that comprises a non-transitory computer memory/one or more memory devices) that stores and maintains data associated with reconstructing three-dimensional objects from two-dimensional digital images. For example, the data storage manager 708 can store information associated with digital videos including video metadata. The data storage manager 708 can also store information associated with encoding digital videos such as downsampling distortion, constant rate factor transition thresholds, encoding parameters, and digital video encodings.

Figure 8:
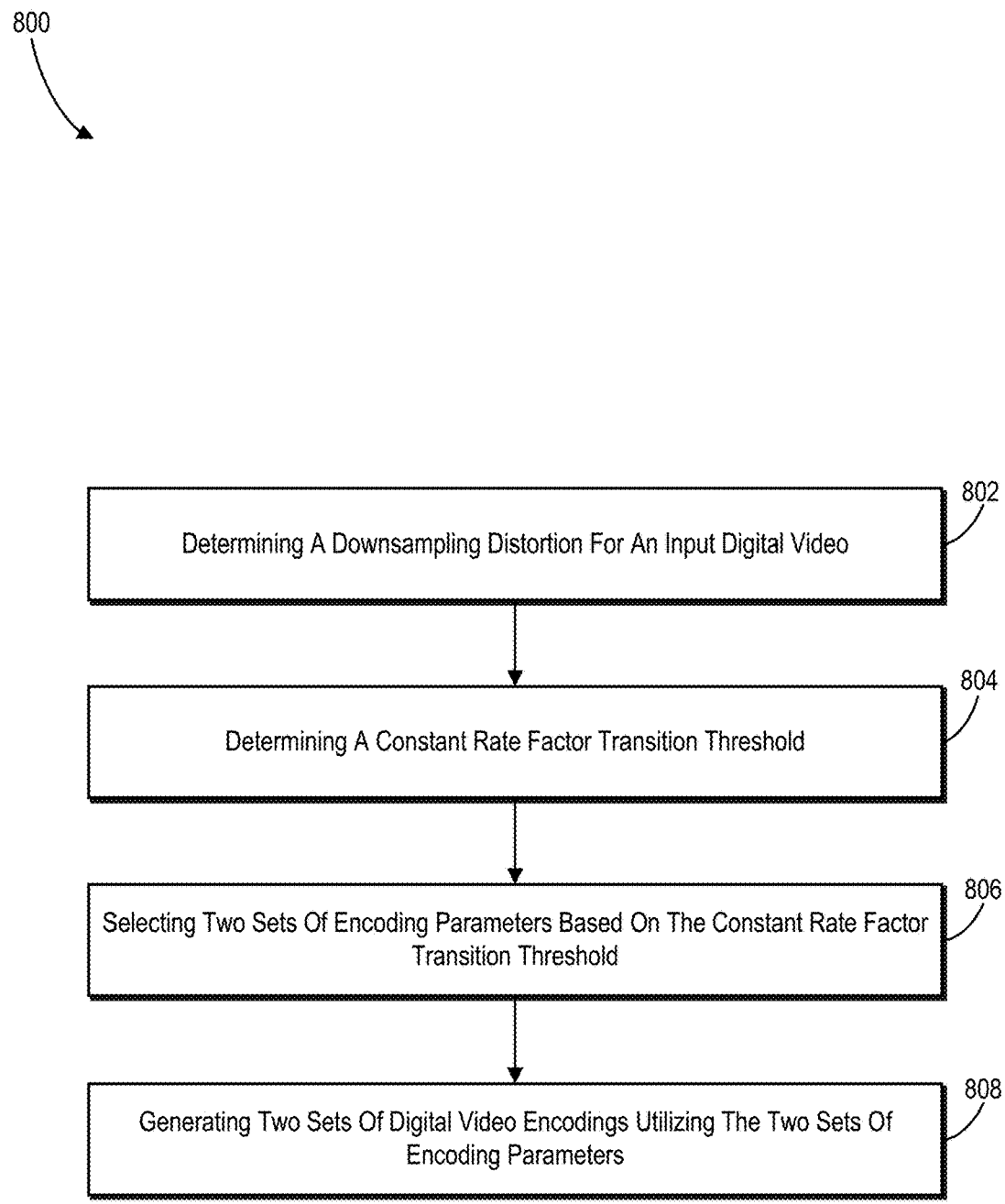
FIG. 8 illustrates a flowchart of a series of acts for generating digital video encodings based on downscaling distortion of digital video content in accordance with one or more implementations.

Turning now to FIG. 8, this figure shows a flowchart of a series of acts 800 of generating two-phase digital video encodings based on downscaling distortion of digital video content. While FIG. 8 illustrates acts according to one embodiment, alternative embodiments may omit, add to, reorder, and/or modify any of the acts shown in FIG. 8. The acts of FIG. 8 can be performed as part of a method. Alternatively, a non-transitory computer readable medium can comprise instructions, that when executed by one or more processors, cause a computing device to perform the acts of FIG. 8. In still further embodiments, a system can perform the acts of FIG. 8.

As shown, the series of acts 800 includes an act 802 of determining a downsampling distortion for an input digital video. For example, act 802 involves determining a downsampling distortion for an input digital video, wherein the downsampling distortion comprises a measure of distortion resulting from downsampling the input digital video.

Act 802 can involve generating a downsampled digital video of the input digital video by reducing a resolution of the input digital video. For example, the downsampled digital video can include half or at least half of the resolution of the input digital video. Act 802 can then involve generating an upsampled digital video by increasing a resolution of the downsampled digital video. Additionally, act 802 can involve determining the downsampling distortion by comparing the input digital video to the upsampled digital video. For instance, act 802 can involve determining a structural similarity for the input digital video by utilizing a filter to compare the input digital video to the upsampled digital video. More specifically, act 802 can involve utilizing the filter to generate a value of structure similarity on a structural similarity index that indicates the downsampling distortion for the input digital video.

The series of acts 800 also includes an act 804 of determining a constant rate factor transition threshold. For example, act 804 involves determining a constant rate factor transition threshold for the input digital video utilizing the downsampling distortion. Act 804 can involve determining a mapping between the downsampling distortion and the constant rate factor transition threshold by fitting the downsampling distortion to a distortion-threshold curve generated based on historical downsampling distortions and historical constant rate factor transition thresholds.

Additionally, the series of acts 800 includes an act 806 of selecting two sets of encoding parameters based on the constant rate factor transition threshold. For example, act 806 involves selecting a first set of encoding parameters below the constant rate factor transition threshold and a second set of encoding parameters at or above the constant rate factor transition threshold.

Act 806 can involve selecting a first plurality of encoding parameters comprising a first constant rate factor below the constant rate factor transition threshold. Act 806 can then involve selecting a second plurality of encoding parameters comprising a second constant rate factor below the constant rate factor transition threshold, the second constant rate factor being different than the first constant rate factor.

Act 806 can involve selecting a first plurality of encoding parameters comprising a first encoding resolution and a constant rate factor at or above the constant rate factor transition threshold. Act 806 can further involve selecting a second plurality of encoding parameters comprising a second encoding resolution different from the first encoding resolution and the constant rate factor.

Additionally, as part of act 806, or as an additional act, the series of acts 800 can include determining a storage limit for the first set of digital video encodings and the second set of digital video encodings. The series of acts 800 can also include selecting a lowest constant rate factor for the first set of digital video encodings based on the storage limit for the first set of digital video encodings and the second set of digital video encodings.

The series of acts 800 further includes an act 808 of generating two sets of digital video encodings utilizing the two sets of encoding parameters. For example, act 808 involves generating a first set of digital video encodings of the input digital video utilizing the first set of encoding parameters and a second set of digital video encodings of the input digital video utilizing the second set of encoding parameters.

Act 808 can involve generating a first digital video encoding by applying the first plurality of encoding parameters comprising the first constant rate factor to the input digital video. Act 808 can then involve generating a second digital video encoding by applying the second plurality of encoding parameters comprising the second constant rate factor to the input digital video. Additionally, the first digital video encoding and the second digital video encoding can have a single encoding resolution.

Additionally, act 808 can involve generating a first digital video encoding utilizing the first plurality of encoding parameters by applying the first encoding resolution and the constant rate factor to the input digital video. Act 808 can also involve generating a second digital video encoding utilizing the second plurality of encoding parameters by applying the second encoding resolution and the constant rate factor to the input digital video. Specifically, the first encoding resolution can be different than the second encoding resolution.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 9:
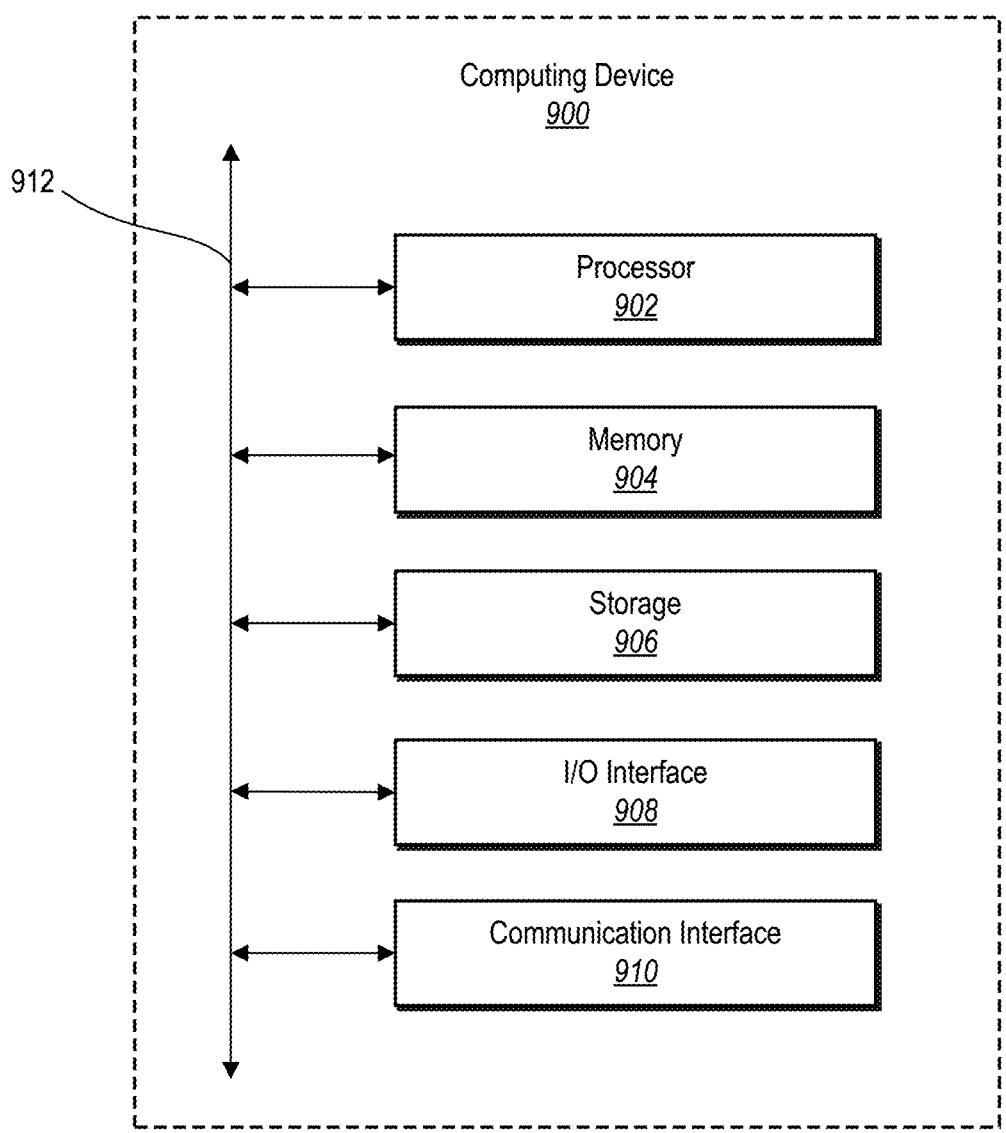
FIG. 9 illustrates a block diagram of an exemplary computing device in accordance with one or more embodiments.

FIG. 9 illustrates a block diagram of exemplary computing device 900 that may be configured to perform one or more of the processes described above. One will appreciate that one or more computing devices such as the computing device 900 may implement the system(s) of FIG. 1. As shown by FIG. 9, the computing device 900 can comprise a processor 902, a memory 904, a storage device 906, an I/O interface 908, and a communication interface 910, which may be communicatively coupled by way of a communication infrastructure 912. In certain embodiments, the computing device 900 can include fewer or more components than those shown in FIG. 9. Components of the computing device 900 shown in FIG. 9 will now be described in additional detail.

In one or more embodiments, the processor 902 includes hardware for executing instructions, such as those making up a computer program. As an example, and not by way of limitation, to execute instructions for dynamically modifying workflows, the processor 902 may retrieve (or fetch) the instructions from an internal register, an internal cache, the memory 904, or the storage device 906 and decode and execute them. The memory 904 may be a volatile or non-volatile memory used for storing data, metadata, and programs for execution by the processor(s). The storage device 906 includes storage, such as a hard disk, flash disk drive, or other digital storage device, for storing data or instructions for performing the methods described herein.

The I/O interface 908 allows a user to provide input to, receive output from, and otherwise transfer data to and receive data from computing device 900. The I/O interface 908 may include a mouse, a keypad or a keyboard, a touch screen, a camera, an optical scanner, network interface, modem, other known I/O devices or a combination of such I/O interfaces. The I/O interface 908 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 908 is configured to provide graphical data to a display for presentation to a user. The graphical data may be representative of one or more graphical user interfaces and/or any other graphical content as may serve a particular implementation.

The communication interface 910 can include hardware, software, or both. In any event, the communication interface 910 can provide one or more interfaces for communication (such as, for example, packet-based communication) between the computing device 900 and one or more other computing devices or networks. As an example, and not by way of limitation, the communication interface 910 may include a network interface controller (NIC) or network adapter for communicating with an Ethernet or other wire-based network or a wireless NIC (WNIC) or wireless adapter for communicating with a wireless network, such as a WI-FI.

Additionally, the communication interface 910 may facilitate communications with various types of wired or wireless networks. The communication interface 910 may also facilitate communications using various communication protocols. The communication infrastructure 912 may also include hardware, software, or both that couples components of the computing device 900 to each other. For example, the communication interface 910 may use one or more networks and/or protocols to enable a plurality of computing devices connected by a particular infrastructure to communicate with each other to perform one or more aspects of the processes described herein. To illustrate, the digital content campaign management process can allow a plurality of devices (e.g., a client device and server devices) to exchange information using various communication networks and protocols for sharing information such as electronic messages, user interaction information, engagement metrics, or campaign management resources.

As mentioned above, the video encoding system 102 can be associated with a social networking system. A social networking system may enable its users (such as persons or organizations) to interact with the system and with each other. The social networking system may, with input from a user, create and store in the social networking system a user profile associated with the user. The user profile may include demographic information, communication-channel information, and information on personal interests of the user. The social networking system may also, with input from a user, create and store a record of relationships of the user with other users of the social networking system, as well as provide services (e.g. wall posts, photo-sharing, online calendars and event organization, messaging, games, or advertisements) to facilitate social interaction between or among users. Also, the social networking system may allow users to post photographs and other multimedia content items to a user's profile page (typically known as "wall posts" or "timeline posts") or in a photo album, both of which may be accessible to other users of the social networking system depending upon the user's configured privacy settings.

Figure 10:
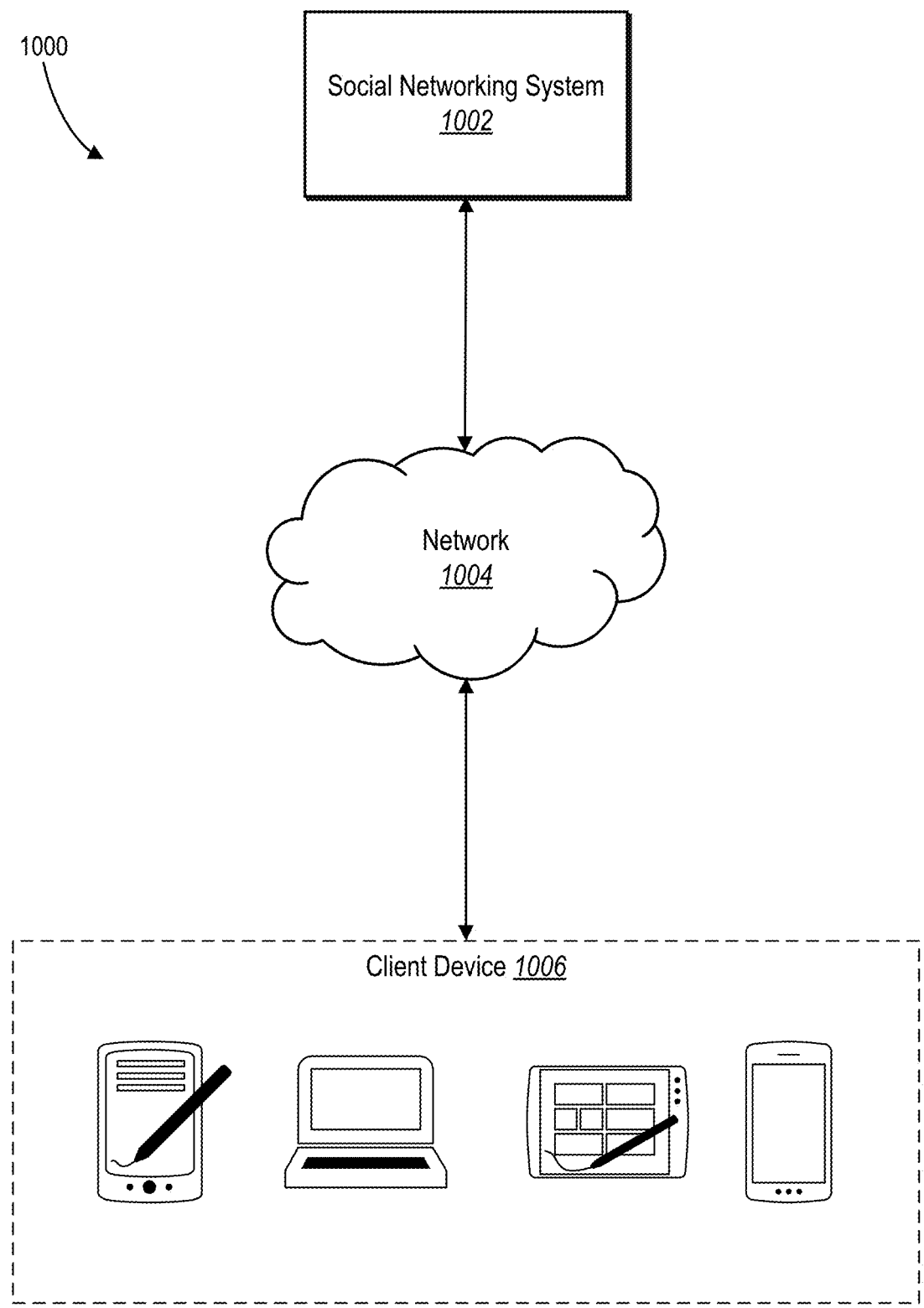
FIG. 10 illustrates an example network environment of a social networking system in accordance with one or more implementations.

FIG. 10 illustrates an example network environment 1000 of a networking system (e.g., social networking system 1002). Network environment 1000 includes a client system 1006 and a social networking system 1002 connected to each other by a network 1004. Although FIG. 10 illustrates a particular arrangement of client system 1006, social networking system 1002, and network 1004, this disclosure contemplates any suitable arrangement of client system 1006, social networking system 1002, and network 1004. As an example, and not by way of limitation, two or more of client system 1006 and social networking system 1002 may be connected to each other directly, bypassing network 1004. As another example, two or more of client system 1006 and social networking system 1002 may be physically or logically co-located with each other in whole or in part. Moreover, although FIG. 10 illustrates a particular number of client systems 1006, social networking systems 1002, and networks 1004, this disclosure contemplates any suitable number of client systems 1006, social networking systems 1002, and networks 1004. As an example, and not by way of limitation, network environment 1000 may include multiple client system 1006, social networking systems 1002, and networks 1004.

This disclosure contemplates any suitable network 1004. As an example, and not by way of limitation, one or more portions of network 1004 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 1004 may include one or more networks 1004.

Links may connect client system 1006 and social networking system 1002 to communication network 1004 or to each other. This disclosure contemplates any suitable links. In particular embodiments, one or more links include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout network environment 1000. One or more first links may differ in one or more respects from one or more second links.

In particular embodiments, client system 1006 may be an electronic device including hardware, software, or embedded logic components or a combination of two or more such components and capable of carrying out the appropriate functionalities implemented or supported by client system 1006. As an example, and not by way of limitation, a client system 1006 may include any of the computing devices discussed above in relation to FIG. 10. A client system 1006 may enable a network user at client system 1006 to access network 1004. A client system 1006 may enable its user to communicate with other users at other client systems 1006.

In particular embodiments, client system 1006 may include a web browser, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 1006 may enter a Uniform Resource Locator (URL) or other address directing the web browser to a particular server (such as server, or a server associated with a third-party system), and the web browser may generate a Hyper Text Transfer Protocol (HTTP) request and communicate the HTTP request to server. The server may accept the HTTP request and communicate to client system 1006 one or more Hyper Text Markup Language (HTML) files responsive to the HTTP request. Client system 1006 may render a webpage based on the HTML files from the server for presentation to the user. This disclosure contemplates any suitable webpage files. As an example, and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social networking system 1002 may be a network-addressable computing system that can host an online social network. Social networking system 1002 may generate, store, receive, and send social networking data, such as, for example, user-profile data, concept-profile data, social-graph information, or other suitable data related to the online social network. Social networking system 1002 may be accessed by the other components of network environment 1000 either directly or via network 1004. In particular embodiments, social networking system 1002 may include one or more servers. Each server may be a unitary server or a distributed server spanning multiple computers or multiple datacenters. Servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by server. In particular embodiments, social networking system 1002 may include one or more data stores. Data stores may be used to store various types of information. In particular embodiments, the information stored in data stores may be organized according to specific data structures. In particular embodiments, each data store may be a relational, columnar, correlation, or other suitable database. Although this disclosure describes or illustrates particular types of databases, this disclosure contemplates any suitable types of databases. Particular embodiments may provide interfaces that enable a client system 1006, a social networking system 1002, or a third-party system to manage, retrieve, modify, add, or delete, the information stored in data store.

In particular embodiments, social networking system 1002 may store one or more social graphs in one or more data stores. In particular embodiments, a social graph may include multiple nodes—which may include multiple user nodes (each corresponding to a particular user) or multiple concept nodes (each corresponding to a particular concept)—and multiple edges connecting the nodes. Social networking system 1002 may provide users of the online social network the ability to communicate and interact with other users. In particular embodiments, users may join the online social network via social networking system 1002 and then add connections (e.g., relationships) to a number of other users of social networking system 1002 whom they want to be connected to. Herein, the term "friend" may refer to any other user of social networking system 1002 with whom a user has formed a connection, association, or relationship via social networking system 1002.

In particular embodiments, social networking system 1002 may provide users with the ability to take actions on various types of items or objects, supported by social networking system 1002. As an example, and not by way of limitation, the items and objects may include groups or social networks to which users of social networking system 1002 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social networking system 1002 or by an external system of a third-party system, which is separate from social networking system 1002 and coupled to social networking system 1002 via a network 1004.

In particular embodiments, social networking system 1002 may be capable of linking a variety of entities. As an example, and not by way of limitation, social networking system 1002 may enable users to interact with each other as well as receive content from third-party systems or other entities, or to allow users to interact with these entities through an application programming interfaces (API) or other communication channels.

In particular embodiments, a third-party system may include one or more types of servers, one or more data stores, one or more interfaces, including but not limited to APIs, one or more web services, one or more content sources, one or more networks, or any other suitable components, e.g., that servers may communicate with. A third-party system may be operated by a different entity from an entity operating social networking system 1002. In particular embodiments, however, social networking system 1002 and third-party systems may operate in conjunction with each other to provide social networking services to users of social networking system 1002. In this sense, social networking system 1002 may provide a platform, or backbone, which other systems, such as third-party systems, may use to provide social networking services and functionality to users across the Internet.

In particular embodiments, a third-party system may include a third-party content object provider. A third-party content object provider may include one or more sources of content objects, which may be communicated to a client system 1006. As an example, and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social networking system 1002 also includes user-generated content objects, which may enhance a user's interactions with social networking system 1002. User-generated content may include anything a user can add, upload, send, or "post" to social networking system 1002. As an example, and not by way of limitation, a user communicates posts to social networking system 1002 from a client system 1006. Posts may include data such as status updates or other textual data, location information, photos, videos, links, music or other similar data or media. Content may also be added to social networking system 1002 by a third-party through a "communication channel," such as a newsfeed or stream.

In particular embodiments, social networking system 1002 may include a variety of servers, sub-systems, programs, modules, logs, and data stores. In particular embodiments, social networking system 1002 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social networking system 1002 may also include suitable components such as network interfaces, security mechanisms, load balancers, failover servers, management-and-network-operations consoles, other suitable components, or any suitable combination thereof. In particular embodiments, social networking system 1002 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example, and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social networking system 1002 to one or more client systems 1006 or one or more third-party system via network 1004. The web server may include a mail server or other messaging functionality for receiving and routing messages between social networking system 1002 and one or more client systems 1006. An API-request server may allow a third-party system to access information from social networking system 1002 by calling one or more APIs. An action logger may be used to receive communications from a web server about a user's actions on or off social networking system 1002. In conjunction with the action log, a third-party-content-object log may be maintained of user exposures to third-party-content objects. A notification controller may provide information regarding content objects to a client system 1006. Information may be pushed to a client system 1006 as notifications, or information may be pulled from client system 1006 responsive to a request received from client system 1006. Authorization servers may be used to enforce one or more privacy settings of the users of social networking system 1002. A privacy setting of a user determines how particular information associated with a user can be shared. The authorization server may allow users to opt in to or opt out of having their actions logged by social networking system 1002 or shared with other systems, such as, for example, by setting appropriate privacy settings. Third-party-content-object stores may be used to store content objects received from third parties, such as a third-party system. Location stores may be used for storing location information received from client systems 1006 associated with users. Advertisement-pricing modules may combine social information, the current time, location information, or other suitable information to provide relevant advertisements, in the form of notifications, to a user.

Figure 11:
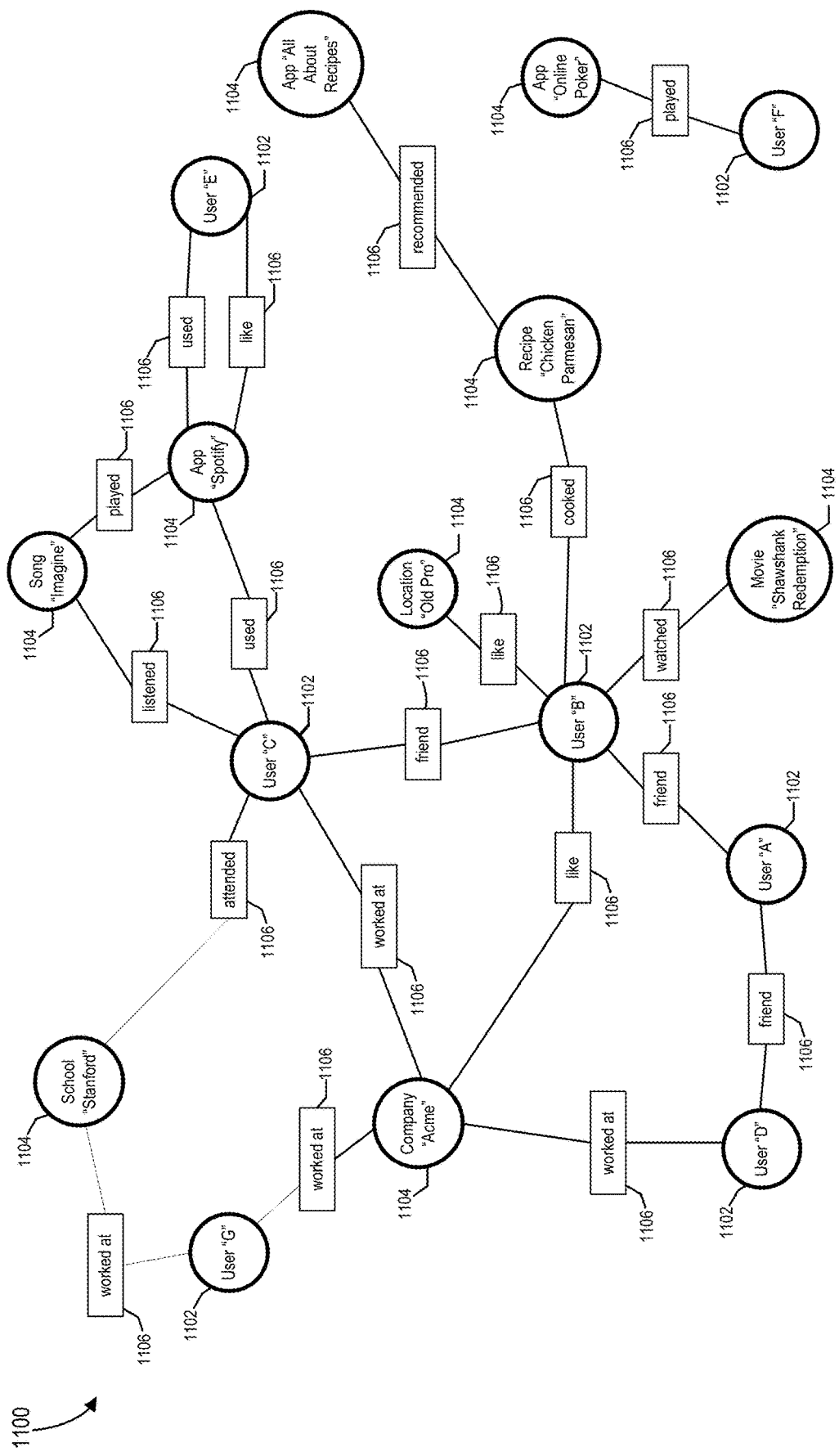
FIG. 11 illustrates an example social graph for a social networking system in accordance with one or more implementations.

FIG. 11 illustrates example social graph 1100. In particular embodiments, social networking system 1002 may store one or more social graphs 1100 in one or more data stores. In particular embodiments, social graph 1100 may include multiple nodes—which may include multiple user nodes 1102 or multiple concept nodes 1104—and multiple edges 1106 connecting the nodes. Example social graph 1100 illustrated in FIG. 11 is shown, for didactic purposes, in a two-dimensional visual map representation. In particular embodiments, a social networking system 1002, client system 1006, or third-party system may access social graph 1100 and related social-graph information for suitable applications. The nodes and edges of social graph 1100 may be stored as data objects, for example, in a data store (such as a social-graph database). Such a data store may include one or more searchable or query able indexes of nodes or edges of social graph 1100.

In particular embodiments, a user node 1102 may correspond to a user of social networking system 1002. As an example, and not by way of limitation, a user may be an individual (human user), an entity (e.g., an enterprise, business, or third-party application), or a group (e.g., of individuals or entities) that interacts or communicates with or over social networking system 1002. In particular embodiments, when a user registers for an account with social networking system 1002, social networking system 1002 may create a user node 1102 corresponding to the user, and store the user node 1102 in one or more data stores. Users and user nodes 1102 described herein may, where appropriate, refer to registered users and user nodes 1102 associated with registered users. In addition, or as an alternative, users and user nodes 1102 described herein may, where appropriate, refer to users that have not registered with social networking system 1002. In particular embodiments, a user node 1102 may be associated with information provided by a user or information gathered by various systems, including social networking system 1002. As an example, and not by way of limitation, a user may provide his or her name, profile picture, contact information, birth date, sex, marital status, family status, employment, education background, preferences, interests, or other demographic information. Each user node of the social graph may have a corresponding web page (typically known as a profile page). In response to a request including a user name, the social networking system can access a user node corresponding to the user name, and construct a profile page including the name, a profile picture, and other information associated with the user. A profile page of a first user may display to a second user all or a portion of the first user's information based on one or more privacy settings by the first user and the relationship between the first user and the second user.

In particular embodiments, a concept node 1104 may correspond to a concept. As an example and not by way of limitation, a concept may correspond to a place (such as, for example, a movie theater, restaurant, landmark, or city); a website (such as, for example, a website associated with social-network system 1002 or a third-party website associated with a web-application server); an entity (such as, for example, a person, business, group, sports team, or celebrity); a resource (such as, for example, an audio file, video file, digital photo, text file, structured document, or application) which may be located within social networking system 1002 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 1104 may be associated with information of a concept provided by a user or information gathered by various systems, including social networking system 1002. As an example, and not by way of limitation, information of a concept may include a name or a title; one or more images (e.g., an image of the cover page of a book); a location (e.g., an address or a geographical location); a web site (which may be associated with a URL); contact information (e.g., a phone number or an email address); other suitable concept information; or any suitable combination of such information. In particular embodiments, a concept node 1104 may be associated with one or more data objects corresponding to information associated with concept node 1104. In particular embodiments, a concept node 1104 may correspond to one or more webpages.

In particular embodiments, a node in social graph 1100 may represent or be represented by a webpage (which may be referred to as a "profile page"). Profile pages may be hosted by or accessible to social networking system 1002. Profile pages may also be hosted on third-party websites associated with a third-party system. As an example, and not by way of limitation, a profile page corresponding to a particular external webpage may be the particular external webpage and the profile page may correspond to a particular concept node 1104. Profile pages may be viewable by all or a selected subset of other users. As an example, and not by way of limitation, a user node 1102 may have a corresponding user-profile page in which the corresponding user may add content, make declarations, or otherwise express himself or herself. As another example and not by way of limitation, a concept node 1104 may have a corresponding concept-profile page in which one or more users may add content, make declarations, or express themselves, particularly in relation to the concept corresponding to concept node 1104.

In particular embodiments, a concept node 1104 may represent a third-party webpage or resource hosted by a third-party system. The third-party webpage or resource may include, among other elements, content, a selectable or other icon, or other inter-actable object (which may be implemented, for example, in JavaScript, AJAX, or PHP codes) representing an action or activity. As an example, and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client system 1006 to send to social networking system 1002 a message indicating the user's action. In response to the message, social networking system 1002 may create an edge (e.g., an "eat" edge) between a user node 1102 corresponding to the user and a concept node 1104 corresponding to the third-party webpage or resource and store edge 1106 in one or more data stores.

In particular embodiments, a pair of nodes in social graph 1100 may be connected to each other by one or more edges 1106. An edge 1106 connecting a pair of nodes may represent a relationship between the pair of nodes. In particular embodiments, an edge 1106 may include or represent one or more data objects or attributes corresponding to the relationship between a pair of nodes. As an example, and not by way of limitation, a first user may indicate that a second user is a "friend" of the first user. In response to this indication, social networking system 1002 may send a "friend request" to the second user. If the second user confirms the "friend request," social networking system 1002 may create an edge 1106 connecting the first user's user node 1102 to the second user's user node 1102 in social graph 1100 and store edge 1106 as social-graph information in one or more of data stores. In the example of FIG. 11, social graph 1100 includes an edge 1106 indicating a friend relation between user nodes 1102 of user "A" and user "B" and an edge indicating a friend relation between user nodes 1102 of user "C" and user "B." Although this disclosure describes or illustrates particular edges 1106 with particular attributes connecting particular user nodes 1102, this disclosure contemplates any suitable edges 1106 with any suitable attributes connecting user nodes 1102. As an example, and not by way of limitation, an edge 1106 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 1100 by one or more edges 1106.

In particular embodiments, an edge 1106 between a user node 1102 and a concept node 1104 may represent a particular action or activity performed by a user associated with user node 1102 toward a concept associated with a concept node 1104. As an example, and not by way of limitation, as illustrated in FIG. 11, a user may "like," "attended," "played," "listened," "cooked," "worked at," or "watched" a concept, each of which may correspond to an edge type or subtype. A concept-profile page corresponding to a concept node 1104 may include, for example, a selectable "check in" icon (such as, for example, a clickable "check in" icon) or a selectable "add to favorites" icon. Similarly, after a user clicks these icons, social networking system 1002 may create a "favorite" edge or a "check in" edge in response to a user's action corresponding to a respective action. As another example and not by way of limitation, a user (user "C") may listen to a particular song ("Ramble On") using a particular application (SPOTIFY, which is an online music application). In this case, social networking system 1002 may create a "listened" edge 1106 and a "used" edge (as illustrated in FIG. 11) between user nodes 1102 corresponding to the user and concept nodes 1104 corresponding to the song and application to indicate that the user listened to the song and used the application. Moreover, social networking system 1002 may create a "played" edge 1106 (as illustrated in FIG. 11) between concept nodes 1104 corresponding to the song and the application to indicate that the particular song was played by the particular application. In this case, "played" edge 1106 corresponds to an action performed by an external application (SPOTIFY) on an external audio file (the song "Imagine"). Although this disclosure describes particular edges 1106 with particular attributes connecting user nodes 1102 and concept nodes 1104, this disclosure contemplates any suitable edges 1106 with any suitable attributes connecting user nodes 1102 and concept nodes 1104. Moreover, although this disclosure describes edges between a user node 1102 and a concept node 1104 representing a single relationship, this disclosure contemplates edges between a user node 1102 and a concept node 1104 representing one or more relationships. As an example, and not by way of limitation, an edge 1106 may represent both that a user likes and has used at a particular concept. Alternatively, another edge 1106 may represent each type of relationship (or multiples of a single relationship) between a user node 1102 and a concept node 1104 (as illustrated in FIG. 11 between user node 1102 for user "E" and concept node 1104 for "SPOTIFY").

In particular embodiments, social networking system 1002 may create an edge 1106 between a user node 1102 and a concept node 1104 in social graph 1100. As an example and not by way of limitation, a user viewing a concept-profile page (such as, for example, by using a web browser or a special-purpose application hosted by the user's client system 1006) may indicate that he or she likes the concept represented by the concept node 1104 by clicking or selecting a "Like" icon, which may cause the user's client system 1006 to send to social networking system 1002 a message indicating the user's liking of the concept associated with the concept-profile page. In response to the message, social networking system 1002 may create an edge 1106 between user node 1102 associated with the user and concept node 1104, as illustrated by "like" edge 1106 between the user and concept node 1104. In particular embodiments, social networking system 1002 may store an edge 1106 in one or more data stores. In particular embodiments, an edge 1106 may be automatically formed by social networking system 1002 in response to a particular user action. As an example, and not by way of limitation, if a first user uploads a picture, watches a movie, or listens to a song, an edge 1106 may be formed between user node 1102 corresponding to the first user and concept nodes 1104 corresponding to those concepts. Although this disclosure describes forming particular edges 1106 in particular manners, this disclosure contemplates forming any suitable edges 1106 in any suitable manner.

In particular embodiments, an advertisement may be text (which may be HTML-linked), one or more images (which may be HTML-linked), one or more videos, audio, one or more ADOBE FLASH files, a suitable combination of these, or any other suitable advertisement in any suitable digital format presented on one or more webpages, in one or more e-mails, or in connection with search results requested by a user. In addition, or as an alternative, an advertisement may be one or more sponsored stories (e.g., a news-feed or ticker item on social networking system 1002). A sponsored story may be a social action by a user (such as "liking" a page, "liking" or commenting on a post on a page, RSVPing to an event associated with a page, voting on a question posted on a page, checking in to a place, using an application or playing a game, or "liking" or sharing a website) that an advertiser promotes, for example, by having the social action presented within a pre-determined area of a profile page of a user or other page, presented with additional information associated with the advertiser, bumped up or otherwise highlighted within news feeds or tickers of other users, or otherwise promoted. The advertiser may pay to have the social action promoted. As an example, and not by way of limitation, advertisements may be included among the search results of a search-results page, where sponsored content is promoted over non-sponsored content.

In particular embodiments, an advertisement may be requested for display within social networking-system webpages, third-party webpages, or other pages. An advertisement may be displayed in a dedicated portion of a page, such as in a banner area at the top of the page, in a column at the side of the page, in a GUI of the page, in a pop-up window, in a drop-down menu, in an input field of the page, over the top of content of the page, or elsewhere with respect to the page. In addition, or as an alternative, an advertisement may be displayed within an application. An advertisement may be displayed within dedicated pages, requiring the user to interact with or watch the advertisement before the user may access a page or utilize an application. The user may, for example view the advertisement through a web browser.

A user may interact with an advertisement in any suitable manner. The user may click or otherwise select the advertisement. By selecting the advertisement, the user may be directed to (or a browser or other application being used by the user) a page associated with the advertisement. At the page associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). Alternatively, by selecting the advertisement, social networking system 1002 may execute or modify a particular action of the user.

An advertisement may also include social networking-system functionality that a user may interact with. As an example, and not by way of limitation, an advertisement may enable a user to "like" or otherwise endorse the advertisement by selecting an icon or link associated with endorsement. As another example and not by way of limitation, an advertisement may enable a user to search (e.g., by executing a query) for content related to the advertiser. Similarly, a user may share the advertisement with another user (e.g., through social networking system 1002) or RSVP (e.g., through social networking system 1002) to an event associated with the advertisement. In addition, or as an alternative, an advertisement may include social networking-system context directed to the user. As an example, and not by way of limitation, an advertisement may display information about a friend of the user within social networking system 1002 who has taken an action associated with the subject matter of the advertisement.

In particular embodiments, social networking system 1002 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social networking system 1002 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part on the history of the user's actions. Coefficients may be used to predict any number of actions, which may be within or outside of the online social network. As an example and not by way of limitation, these actions may include various types of communications, such as sending messages, posting content, or commenting on content; various types of observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social networking system 1002 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example, and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 90% of the overall coefficient, while the relationship between the user and the object may comprise 40% of the overall coefficient. In particular embodiments, the social networking system 1002 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example, and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social networking system 1002 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social networking system 1002 may calculate a coefficient based on a user's actions. Social networking system 1002 may monitor such actions on the online social network, on a third-party system, on other suitable systems, or any combination thereof. Any suitable type of user actions may be tracked or monitored. Typical user actions include viewing profile pages, creating or posting content, interacting with content, joining groups, listing and confirming attendance at events, checking-in at locations, liking particular pages, creating pages, and performing other tasks that facilitate social action. In particular embodiments, social networking system 1002 may calculate a coefficient based on the user's actions with particular types of content. The content may be associated with the online social network, a third-party system, or another suitable system. The content may include users, profile pages, posts, news stories, headlines, instant messages, chat room conversations, emails, advertisements, pictures, video, music, other suitable objects, or any combination thereof. Social networking system 1002 may analyze a user's actions to determine whether one or more of the actions indicate an affinity for subject matter, content, other users, and so forth. As an example, and not by way of limitation, if a user may make frequently posts content related to "coffee" or variants thereof, social networking system 1002 may determine the user has a high coefficient with respect to the concept "coffee". Particular actions or types of actions may be assigned a higher weight and/or rating than other actions, which may affect the overall calculated coefficient. As an example, and not by way of limitation, if a first user emails a second user, the weight or the rating for the action may be higher than if the first user simply views the user-profile page for the second user.

In particular embodiments, social networking system 1002 may calculate a coefficient based on the type of relationship between particular objects. Referencing the social graph 1100, social networking system 1002 may analyze the number and/or type of edges 1106 connecting particular user nodes 1102 and concept nodes 1104 when calculating a coefficient. As an example, and not by way of limitation, user nodes 1102 that are connected by a spouse-type edge (representing that the two users are married) may be assigned a higher coefficient than user nodes 1102 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example, and not by way of limitation, if a user is tagged in first photo, but merely likes a second photo, social networking system 1002 may determine that the user has a higher coefficient with respect to the first photo than the second photo because having a tagged-in-type relationship with content may be assigned a higher weight and/or rating than having a like-type relationship with content. In particular embodiments, social networking system 1002 may calculate a coefficient for a first user based on the relationship one or more second users have with a particular object. In other words, the connections and coefficients other users have with an object may affect the first user's coefficient for the object. As an example, and not by way of limitation, if a first user is connected to or has a high coefficient for one or more second users, and those second users are connected to or have a high coefficient for a particular object, social networking system 1002 may determine that the first user should also have a relatively high coefficient for the particular object. In particular embodiments, the coefficient may be based on the degree of separation between particular objects. Degree of separation between any two nodes is defined as the minimum number of hops required to traverse the social graph from one node to the other. A degree of separation between two nodes can be considered a measure of relatedness between the users or the concepts represented by the two nodes in the social graph. For example, two users having user nodes that are directly connected by an edge (i.e., are first-degree nodes) may be described as "connected users" or "friends." Similarly, two users having user nodes that are connected only through another user node (i.e., are second-degree nodes) may be described as "friends of friends." The lower coefficient may represent the decreasing likelihood that the first user will share an interest in content objects of the user that is indirectly connected to the first user in the social graph 1100. As an example, and not by way of limitation, social-graph entities that are closer in the social graph 1100 (i.e., fewer degrees of separation) may have a higher coefficient than entities that are further apart in the social graph 1100.

In particular embodiments, social networking system 1002 may calculate a coefficient based on location information. Objects that are geographically closer to each other may be considered to be more related, or of more interest, to each other than more distant objects. In particular embodiments, the coefficient of a user towards a particular object may be based on the proximity of the object's location to a current location associated with the user (or the location of a client system 1006 of the user). A first user may be more interested in other users or concepts that are closer to the first user. As an example, and not by way of limitation, if a user is one mile from an airport and two miles from a gas station, social networking system 1002 may determine that the user has a higher coefficient for the airport than the gas station based on the proximity of the airport to the user.

In particular embodiments, social networking system 1002 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social networking system 1002 may provide information that is relevant to user's interests and current circumstances, increasing the likelihood that they will find such information of interest. In particular embodiments, social networking system 1002 may generate content based on coefficient information. Content objects may be provided or selected based on coefficients specific to a user. As an example, and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social networking system 1002 may generate search results based on coefficient information. Search results for a particular user may be scored or ranked based on the coefficient associated with the search results with respect to the querying user. As an example, and not by way of limitation, search results corresponding to objects with higher coefficients may be ranked higher on a search-results page than results corresponding to objects having lower coefficients.

In particular embodiments, social networking system 1002 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system (e.g., via an API or other communication channel), or from another suitable system. In response to the request, social networking system 1002 may calculate the coefficient (or access the coefficient information if it has previously been calculated and stored). In particular embodiments, social networking system 1002 may measure an affinity with respect to a particular process. Different processes (both internal and external to the online social network) may request a coefficient for a particular object or set of objects. Social networking system 1002 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/978,027, filed 22 Dec. 2010, U.S. patent application Ser. No. 12/978,265, filed 23 Dec. 2010, and U.S. patent application Ser. No. 13/642,869, field 1 Oct. 2012, each of which is incorporated by reference.

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example, and not by way of limitation, a user of the online social network may specify privacy settings for a user-profile page identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example, and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example, and not by way of limitation, a particular concept node 1104 corresponding to a particular photo may have a privacy setting specifying that the photo may only be accessed by users tagged in the photo and their friends. In particular embodiments, privacy settings may allow users to opt in or opt out of having their actions logged by social networking system 1002 or shared with other systems (e.g., third-party system). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers may be authorization/privacy servers for enforcing privacy settings. In response to a request from a user (or other entity) for a particular object stored in a data store, social networking system 1002 may send a request to the data store for the object. The request may identify the user associated with the request and may only be sent to the user (or a client system 1006 of the user) if the authorization server determines that the user is authorized to access the object based on the privacy settings associated with the object. If the requesting user is not authorized to access the object, the authorization server may prevent the requested object from being retrieved from the data store, or may prevent the requested object from be sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed is:

1. A method comprising:
   determining, by at least one processor, a downsampling distortion for an input digital video, wherein the downsampling distortion comprises a measure of distortion resulting from downsampling the input digital video;
   determining, by the at least one processor, a constant rate factor transition threshold for the input digital video utilizing the downsampling distortion, wherein the constant rate factor transition threshold defines a point to transition between holding resolution constant and holding constant rate factor constant;
   utilizing the constant rate factor transition threshold determined utilizing the downsampling distortion to select a first set of encoding parameters below the constant rate factor transition threshold, wherein the first set of encoding parameters correspond to different constant rate factor values for encoding digital videos while maintaining encoding resolution values of the digital videos;
   utilizing the constant rate factor transition threshold determined utilizing the downsampling distortion to select a second set of encoding parameters at or above the constant rate factor transition threshold, wherein the second set of encoding parameters correspond to different encoding resolution values of encoded digital videos while maintaining constant rate factor values; and
   generating, by the at least one processor, a first set of digital video encodings of the input digital video utilizing the first set of encoding parameters and a second set of digital video encodings of the input digital video utilizing the second set of encoding parameters.

2. The method as recited in claim 1, wherein determining the constant rate factor transition threshold comprises determining a mapping between the downsampling distortion and the constant rate factor transition threshold by fitting the downsampling distortion to a distortion-threshold curve generated based on historical downsampling distortions and historical constant rate factor transition thresholds.

3. The method as recited in claim 1, wherein determining the downsampling distortion for the input digital video comprises:
   generating a downsampled digital video of the input digital video by reducing a resolution of the input digital video;
   generating an upsampled digital video by increasing a resolution of the downsampled digital video; and
   determining the downsampling distortion by comparing the input digital video to the upsampled digital video.

4. The method as recited in claim 3, wherein determining the downsampling distortion comprises determining a structural similarity for the input digital video by utilizing a filter to compare the input digital video to the upsampled digital video.

5. The method as recited in claim 1, wherein selecting the first set of encoding parameters comprises:
   selecting a first plurality of encoding parameters comprising a first constant rate factor below the constant rate factor transition threshold; and
   selecting a second plurality of encoding parameters comprising a second constant rate factor below the constant rate factor transition threshold, the second constant rate factor being different than the first constant rate factor.

6. The method as recited in claim 5, wherein generating the first set of digital video encodings of the input digital video comprises:
   generating a first digital video encoding by applying the first plurality of encoding parameters comprising the first constant rate factor to the input digital video; and
   generating a second digital video encoding by applying the second plurality of encoding parameters comprising the second constant rate factor to the input digital video,
   wherein the first digital video encoding and the second digital video encoding have a single encoding resolution.

7. The method as recited in claim 1, wherein selecting the second set of encoding parameters comprises:
   selecting a first plurality of encoding parameters comprising a first encoding resolution and a constant rate factor at or above the constant rate factor transition threshold; and
   selecting a second plurality of encoding parameters comprising a second encoding resolution different from the first encoding resolution and the constant rate factor.

8. The method as recited in claim 7, wherein generating the second set of digital video encodings comprises:
   generating a first digital video encoding utilizing the first plurality of encoding parameters by applying the first encoding resolution and the constant rate factor to the input digital video; and
   generating a second digital video encoding utilizing the second plurality of encoding parameters by applying the second encoding resolution and the constant rate factor to the input digital video.

9. The method as recited in claim 1, further comprising:
   determining a storage limit for the first set of digital video encodings and the second set of digital video encodings; and
   selecting a lowest constant rate factor for the first set of digital video encodings based on the storage limit for the first set of digital video encodings and the second set of digital video encodings.

10. A system comprising:
    at least one processor; and
    a non-transitory computer readable storage medium comprising instructions that, when executed by the at least one processor, cause the system to:
    determine a downsampling distortion for an input digital video, wherein the downsampling distortion comprises a measure of distortion resulting from downsampling the input digital video;
    determine a constant rate factor transition threshold for the input digital video utilizing the downsampling distortion, wherein the constant rate factor transition threshold defines a point to transition between holding resolution constant and holding constant rate factor constant;
    utilize the constant rate factor transition threshold determined utilizing the downsampling distortion to select a first set of encoding parameters below the constant rate factor transition threshold, wherein the first set of encoding parameters correspond to different constant rate factor values for encoding digital videos while maintaining encoding resolution values of the digital videos;
    utilize the constant rate factor transition threshold determined utilizing the downsampling distortion to select a second set of encoding parameters at or above the constant rate factor transition threshold, wherein the second set of encoding parameters correspond to different encoding resolution values of encoded digital videos while maintaining constant rate factor values; and
    generate a first set of digital video encodings of the input digital video utilizing the first set of encoding parameters and a second set of digital video encodings of the input digital video utilizing the second set of encoding parameters.

11. The system as recited in claim 10, wherein the instructions that cause the system to determine the constant rate factor transition threshold further cause the system to determine a mapping between the downsampling distortion and the constant rate factor transition threshold by fitting the downsampling distortion to a distortion-threshold curve generated based on historical downsampling distortions and historical constant rate factor transition thresholds.

12. The system as recited in claim 10, wherein the instructions that cause the system to determine the downsampling distortion for the input digital video further cause the system to:
    generate a downsampled digital video of the input digital video by reducing a resolution of the input digital video;
    generate an upsampled digital video by increasing a resolution of the downsampled digital video; and
    determine the downsampling distortion by utilizing a filter that determines a structural similarity between the input digital video and the upsampled digital video.

13. The system as recited in claim 10, wherein the instructions that cause the system to select the first set of encoding parameters further cause the system to:
    select a first plurality of encoding parameters comprising a first constant rate factor below the constant rate factor transition threshold; and
    select a second plurality of encoding parameters comprising a second constant rate factor below the constant rate factor transition threshold, the second constant rate factor being different than the first constant rate factor.

14. The system as recited in claim 13, wherein the instructions that cause the system to generate the first set of digital video encodings of the input digital video further cause the system to:
    generate a first digital video encoding by applying the first plurality of encoding parameters comprising the first constant rate factor to the input digital video; and
    generate a second digital video encoding by applying the second plurality of encoding parameters comprising the second constant rate factor to the input digital video,
    wherein the first digital video encoding and the second digital video encoding have a single encoding resolution.

15. The system as recited in claim 10, wherein the instructions that cause the system to select the second set of encoding parameters further cause the system to:
    select a first plurality of encoding parameters comprising a first encoding resolution and a constant rate factor at or above the constant rate factor transition threshold; and
    select a second plurality of encoding parameters comprising a second encoding resolution different from the first encoding resolution and the constant rate factor.

16. The system as recited in claim 15, wherein the instructions that cause the system to generate the second set of digital video encodings further cause the system to:
    generate a first digital video encoding utilizing the first plurality of encoding parameters by applying the first encoding resolution and the constant rate factor to the input digital video; and
    generate a second digital video encoding utilizing the second plurality of encoding parameters by applying the second encoding resolution and the constant rate factor to the input digital video.

17. A non-transitory computer readable storage medium comprising instructions that, when executed by at least one processor, cause a computing device to:
    determine a downsampling distortion for an input digital video, wherein the downsampling distortion comprises a measure of distortion resulting from downsampling the input digital video;
    determine a constant rate factor transition threshold for the input digital video utilizing the downsampling distortion, wherein the constant rate factor transition threshold defines a point to transition between holding resolution constant and holding constant rate factor constant;
    utilize the constant rate factor transition threshold determined utilizing the downsampling distortion to select a first set of encoding parameters below the constant rate factor transition threshold, wherein the first set of encoding parameters correspond to different constant rate factor values for encoding digital videos while maintaining encoding resolution values of the digital videos;

utilize the constant rate factor transition threshold determined utilizing the downsampling distortion to select a second set of encoding parameters at or above the constant rate factor transition threshold, wherein the second set of encoding parameters correspond to different encoding resolution values of encoded digital videos while maintaining constant rate factor values; and generate a first set of digital video encodings of the input digital video utilizing the first set of encoding parameters and a second set of digital video encodings of the input digital video utilizing the second set of encoding parameters.

18. The non-transitory computer readable storage medium as recited in claim 17, wherein the instructions that cause the computing device to determine the constant rate factor transition threshold further cause the computing device to determine a mapping between the downsampling distortion and the constant rate factor transition threshold by fitting the downsampling distortion to a distortion-threshold curve generated based on historical downsampling distortions and historical constant rate factor transition thresholds.

19. The non-transitory computer readable storage medium as recited in claim 17, wherein the instructions that cause the computing device to select the first set of encoding parameters further cause the computing device to:

generate a first digital video encoding by applying a first constant rate factor below the constant rate factor transition threshold to the input digital video; and generate a second digital video encoding by applying a second constant rate factor below the constant rate factor transition threshold to the input digital video, wherein the first digital video encoding and the second digital video encoding have a single encoding resolution.

20. The non-transitory computer readable storage medium as recited in claim 17, wherein the instructions that cause the computing device to generate the second set of digital video encodings further cause the computing device to:

generate a first digital video encoding utilizing a first plurality of encoding parameters by applying a first encoding resolution and a constant rate factor at or above the constant rate factor transition threshold to the input digital video; and generate a second digital video encoding utilizing a second plurality of encoding parameters by applying a second encoding resolution and the constant rate factor to the input digital video, wherein the first encoding resolution is different from the second encoding resolution.

* * * * *